(12) United States Patent
Mahapatra et al.

(10) Patent No.: US 12,126,791 B1
(45) Date of Patent: Oct. 22, 2024

(54) CONVERSATIONAL AI-ENCODED LANGUAGE FOR DATA COMPRESSION

(71) Applicant: NVIDIA Corporation, Santa Clara, CA (US)

(72) Inventors: Pratyush Mahapatra, Santa Clara, CA (US); Somayyeh Rahimi, Del Mar, CA (US); Ruthie Lyle, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 78 days.

(21) Appl. No.: 17/664,265

(22) Filed: May 20, 2022

(51) Int. Cl.
| | |
|---|---|
| *H04N 19/103* | (2014.01) |
| *G06V 20/40* | (2022.01) |
| *G06V 40/16* | (2022.01) |
| *G06V 40/20* | (2022.01) |
| *H04L 65/403* | (2022.01) |
| *H04N 19/136* | (2014.01) |

(52) U.S. Cl.
CPC .......... *H04N 19/103* (2014.11); *G06V 20/40* (2022.01); *G06V 40/176* (2022.01); *G06V 40/20* (2022.01); *H04L 65/403* (2013.01); *H04N 19/136* (2014.11)

(58) Field of Classification Search
CPC .... H04N 19/103; H04N 19/136; G06V 20/40; G06V 20/176; G06V 20/20; H04L 65/403
See application file for complete search history.

(56) References Cited

U.S. PATENT DOCUMENTS

| | | | |
|---|---|---|---|
| 9,609,277 B1 * | 3/2017 | Chen | ...................... H04N 7/155 |
| 10,863,179 B1 | 12/2020 | Nandakumar | |
| 11,580,737 B1 | 2/2023 | Miller-Smith | |
| 2010/0162313 A1 | 6/2010 | Ruiz-Velasco | |
| 2011/0279638 A1 | 11/2011 | Periyannan | |
| 2017/0134828 A1 | 5/2017 | Krishnamurthy | |
| 2017/0330029 A1 * | 11/2017 | Turcot | ................. A61B 5/7267 |
| 2018/0014022 A1 | 1/2018 | Cho | |
| 2018/0098030 A1 | 4/2018 | Morabia | |
| 2018/0367757 A1 | 12/2018 | Faulkner | |
| 2019/0188479 A1 | 6/2019 | Balasubramanian | |
| 2019/0230310 A1 | 7/2019 | Faulkner | |
| 2020/0074229 A1 | 3/2020 | AlShikh | |
| 2020/0186749 A1 | 6/2020 | Al | |
| 2021/0329306 A1 * | 10/2021 | Liu | ...................... G06V 40/168 |
| 2022/0207262 A1 | 6/2022 | Jeong | |
| 2022/0308742 A1 | 9/2022 | Ziv | |

(Continued)

OTHER PUBLICATIONS

U.S. Appl. No. 17/382,027, filed Jul. 21, 2021.

(Continued)

*Primary Examiner* — Yassin Alata

(74) *Attorney, Agent, or Firm* — Plumsea Law Group, LLC

(57) ABSTRACT

Systems and methods of compressing video data are disclosed. The proposed systems provide a computer-implemented process configured to classify a person's behavior(s) during a video and encode the behaviors as a representation of the video. When playback of the video is requested, a reconstruction of the video is generated by a video synthesizer based on a reference image of the person and the sequence of codes corresponding to their behavior during the video. Storage and transmission of the video can then be limited to the reference image and the behavioral codes rather than the video file itself, significantly reducing memory and bandwidth requirements.

20 Claims, 13 Drawing Sheets

(56) References Cited

U.S. PATENT DOCUMENTS

2022/0405316 A1　12/2022　Raj
2022/0408056 A1　12/2022　Zheng et al.
2023/0062704 A1　3/2023　Rosner et al.

OTHER PUBLICATIONS

U.S. Appl. No. 63/320,864, filed Mar. 17, 2022.
U.S. Appl. No. 18/045,915, filed Oct. 12, 2022.
U.S. Appl. No. 18/049,446, filed Oct. 25, 2022.
U.S. Appl. No. 17/933,186, filed Sep. 19, 2022.
Wang et al.; "One-Shot Free-View Neural Talking-Head Synthesis for Video Conferencing"; Available online at: <https://arxiv.org/pdf/2011.15126.pdf>; Apr. 2, 2021; 16 pages.
Non-Final Office Action mailed Oct. 13, 2023 for U.S. Appl. No. 18/045,915.
Non-Final Office Action mailed Feb. 15, 2024 for U.S. Appl. No. 18/049,446.
Final Office Action mailed Apr. 5, 2024 for U.S. Appl. No. 18/045,915.
Non-Final Office Action mailed Apr. 11, 2024 for U.S. Appl. No. 17/933,186.
Non Final Office Action Mailed on Aug. 22, 2024 for U.S. Appl. No. 18/045,915.
Notice of Allowance Mailed on Aug. 7, 2024 for U.S. Appl. No. 17/933,186.

* cited by examiner

| BEHAVIOR | CODE |
|---|---|
| BASELINE | 0001 |
| YAWNING | 1001 |
| SIPPING-FROM-STRAW | 2001 |
| SIPPING-FROM-CUP | 2002 |
| HOLDING-CUP | 2003 |
| NODDING | 3005 |
| STRETCHING | 4800 |
| COVERING-MOUTH-WITH-HAND | 5100 |
| WIPING-FACE-WITH-TISSUE | 5120 |
| HAND-CUPPING-CHIN | 5140 |
| HEAD-HELD-BY-BOTH-PALMS | 5180 |
| HEAD-DOWN | 6021 |
| WRITING-ON-PAD | 7020 |
| TYPING-ON-KEYS | 7030 |
| THUMBS-UP | 5500 |
| EYES-CLOSED | 3900 |
| HEAD-TURNED | 3020 |
| SHAKING-HEAD | 3010 |
| RAISING-ARMS-IN-AIR | 5600 |
| GRINNING | 9100 |
| SMILING | 9090 |
| FROWNING | 9020 |
| CONFUSED | 9040 |
| SAD | 9080 |
| ANGRY | 9070 |
| NOT RECOGNIZED | 9999 |

CONVERSATIONAL AI-ENCODED LANGUAGE FOR DATA COMPRESSION

TECHNICAL FIELD

The present disclosure generally relates to processing resources used to perform compression of video data, such as during video conferencing. At least one embodiment pertains to processors or computing systems used to record a reference image frame, and then reconstructing one or more video frames based on said reference image frame.

BACKGROUND

Data compression is widely used to reduce the amount of data required to process, transmit, or store a given quantity of information. Data compression can be understood to refer to the coding of data to minimize its representation. Compression can be used, for example, to reduce the storage requirements for files, to increase the communication rate over a channel, or to reduce redundancy prior to encryption for greater security.

In many areas of modern computing, transmission, storage, and playback of video data is critical to achieving targeted performance, for example in video streaming, teleconferences, cloud-based gaming, and the like. Video compression is commonly used to reduce the data storage and or transmission requirements of a recorded video stream. To facilitate transmitting video data at lower bit rates and storing video data using less storage space, various video compression techniques have been developed.

While conventional video compression techniques can be effective at reducing the size of video bit streams, these techniques are typically computationally intensive. In addition, conventional compression codecs typically have struggled to keep up with the demand for greater video quality and resolution on memory-constrained devices, such as smartphones and other mobile devices, operating on limited-bandwidth networks. Furthermore, the storage requirements for these compressed (encoded) data continue to increase as video resolution increases and as users increasingly rely on video during conferences and other interactions. There is a need for a video compression and retrieval technique that addresses the shortcomings described above.

SUMMARY

In one aspect, a computer-implemented method of compressing video data. The method includes a first step of receiving, by a data compression system accessed via a computing device, first video data of a first user and a second step of detecting, via a behavior recognition module of the data compression system, a first facial expression or pose for the first user occurring at a first time in a first segment of the first video data. A third step includes assigning, via an encoder of the data compression system, the first segment a first code corresponding to the first facial expression, and a fourth step includes storing, in an encoded behavior file for the first video data, the first code, wherein the first code is stored in lieu of the first segment. The method also includes a fifth step of generating, via a video synthesizer and based on the first code, first synthesized video data of the first user having the first facial expression.

In another aspect, another computer-implemented method of compressing video data is disclosed. The method includes a first step of receiving, by a data compression system accessed via a computing device, a video file including a first video of a first user and a second video of a second user engaged in a conference call, and a second step of detecting, via a behavior recognition module of the data compression system, a first facial expression for the first user occurring over a first duration in a first segment of the first video and a second facial expression for the second user occurring over the first duration in a second segment of the second video. A third step includes assigning, via an encoder of the data compression system, the first segment a first code corresponding to the first facial expression, and the second segment a second code corresponding to the second facial expression. A fourth step includes storing, in an encoded behavior file associated with the first video file the first code, wherein the first code is stored in lieu of the first segment and the second code, wherein the second code is stored in lieu of the second segment. A fifth step includes generating, via a video synthesizer and based on the first code and the second code, first synthesized video data representing the first duration of the conference call that includes a simultaneous reconstruction of the first segment and the second segment.

In another aspect, a system for compressing video data includes a processor and machine-readable media including instructions which, when executed by the processor, cause the processor to receive, by a data compression system accessed via a computing device, first video data of a first user, and to detect, via a behavior recognition module of the data compression system, a first facial expression for the first user occurring at a first time in a first segment of the first video data. The instructions further cause the processor to assign, via an encoder of the data compression system, the first segment a first code corresponding to the first facial expression, and to store, in an encoded behavior file for the first video data, the first code, wherein the first code is stored in lieu of the first segment. In addition, the instructions cause the processor to generate, via a video synthesizer and based on the first code, first synthesized video data of the first user having the first facial expression.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Figure 1:
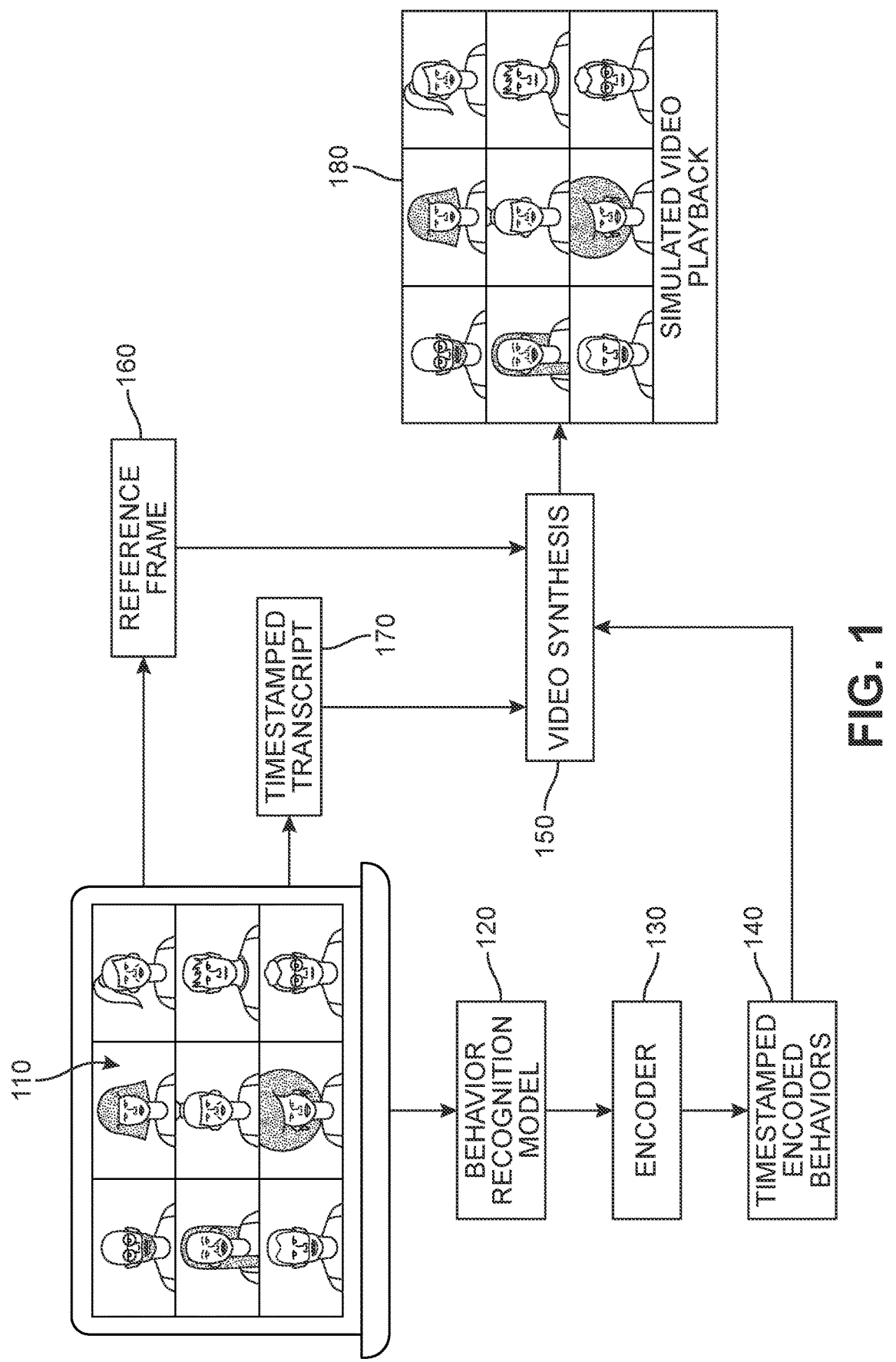
FIG. 1 is an overview of a process of compressing video data using encoded behaviors and generating a simulation of the video data, according to an embodiment.

Digital video requires a significant amount of storage space or bandwidth in its original uncompressed form. Video coding or video compression is the process of compressing (encoding) and decompressing (decoding) video. Video compression makes it possible to transmit or store digital video in a smaller, compressed form. Many video compression standards, including MPEG-2, MPEG-4 and H.264, are well-known in the art today. However, while such standards are useful, the storage needed for conventionally encoded video data remains considerable.

The generative adversarial network (GAN) framework has emerged as a powerful tool for various image and video synthesis tasks, allowing the synthesis of visual content in an unconditional or input-conditional manner. It has enabled the generation of high-resolution photorealistic images and videos, a task that was challenging or impossible with prior methods. It has also led to the creation of many new applications in content creation.

The proposed systems and methods take advantage of improvements in video synthesis to provide a video compression technique that is computationally efficient, and provides a substantial reduction in video size. As will be discussed in greater detail below, the proposed (real-time or offline) encoding process tracks and records the dynamic behaviors and audio for one or more participants in a video conference call using a series of codes. The codes, provided to what has been described as a "talking-head video synthesizer" (see below), will reconstruct a simulated playback of the original video. Thus, the size of the file drops to reflect only the size of the original image used by the video synthesizer and a code document, leading to a significant reduction in bandwidth and vastly improved compression ratios than existing methodologies.

As a general matter, video synthesis focuses on generating video content that preserves the temporal consistency of the output videos. This is usually achieved by using a temporal discriminator, flow-warping loss on neighboring frames, smoothing the inputs before processing, or a post-processing step. Conditional video synthesis generates videos conditioning on input content (e.g., future frame prediction, high-level representation input video, etc.). Some of the proposed embodiments can be understood to incorporate at least two major domains of conditional video synthesis: face reenactment and pose transfer. Face reenactment usually starts by collecting footage of the target person to be synthesized.

Some recently designed GAN frameworks only need a single 2D image of the target person (also referred to herein as a portrait or reference frame) and can synthesize talking videos of this person given arbitrary motions. These motions are represented using either facial landmarks or key points learned without supervision. Since the input is only a 2D image, many methods rely on warping the input or its extracted features and then fill in the un-occluded areas to refine the results. To synthesize the target identity, features are extracted from the source images and information is injected into the generator. Since these methods require only an image as input, they become particularly powerful and can be used in even more cases. Similarly, pose transfer techniques aim at transferring the body pose of one person to another person. It can be seen as the partial or whole body counterpart of face reenactment. Recent works have shown their capability to generate high quality and high-resolution videos for challenging poses.

More specifically, a pure neural rendering approach has been developed by which a talking-head video using a deep network in the one-shot setting is rendered without using a graphics model of the 3D human head. This type of approach can in some cases directly synthesize accessories present in the source image, including eyeglasses, hats, and scarves, without their 3D models. In different embodiments, the encoded behavior of video participants is reconstructed via a local free-view video synthesis model where one can freely change the viewpoint of the talking-head within a large neighborhood of the original viewpoint. The reconstruction model achieves this capability by representing a video using a novel 3D key point representation, where person-specific and motion-related information is decomposed. Both the key points and their decomposition are learned without supervision. Some examples of these techniques are described in further detail in U.S. Patent Publication No. 2021/0329306 published on Oct. 21, 2021 and titled "Video Compression using Neural Networks" to Ming-Yu Liu, et al. (hereinafter the Liu application), the disclosure of which is incorporated by reference in its entirety. The embodiments described herein apply these video synthesis techniques in order to facilitate the data compression and subsequent data presentation based on a digital avatar.

FIG. 1 is a schematic flow diagram illustrating a process for streaming video compression. The video stream can be obtained during a video conferencing session in one example, between one or more senders and one or more receivers (collectively referred to as "participants"). In one embodiment, video streaming comprises video conferencing or teleconferencing. Video streaming comprises, in an embodiment, video game streaming and video game streaming services. In one embodiment, video streaming comprises digital satellite video streaming, such as digital satellite television streaming. In another embodiment video streaming comprises broadcast video streaming. Video streaming, in an embodiment, comprises internet video streaming. In one embodiment, video streaming comprises digital video broadcasting. Video streaming, in an embodiment, comprises any Advanced Televisions Systems Committee (ATSC) approved television or other video broadcast technique, such as cable or broadcast television. In another embodiment video streaming comprises any ATSC mobile/handheld (ATSC-M/H) video broadcast method. In one embodiment, video streaming comprises closed circuit television streaming and other closed circuit digital video capture or broadcast. In another embodiment video streaming comprises video capture and encoding performed by personal digital cameras, such as DSLR cameras, to store, encode, and transmit digital video data. In one embodiment, the proposed embodiments are usable for any video streaming and/or video capture application described above or further described herein. In other examples, a previously recorded video stored remotely can be encoded as described herein for a simplified and near-instantaneous "download" and playback of the video content at a local device.

As will be discussed in greater detail below, in different embodiments, video data for one or more participants 110 (each presented here as a video tile in an array of nine video tiles) will be encoded based on the behaviors exhibited by each participant during the video. Although the proposed systems will primarily discuss the simulation of observer-participant video (i.e., persons who are mainly listeners and present as 'non-speaker' tiles in the array of faces of the video), it can be appreciated that the techniques described can also be extended to the primary speaker in the video call. In FIG. 1, the individual video data for each participant in the array of participants 110 whose faces are displayed during the video call is received by a behavior recognition model 120. The behavior recognition model 120 can review, in near-real-time, the facial expressions and gestures and other actions of a given participant (collectively referred to as behaviors). Each behavior can be detected and fall under a previously defined class or label. The behavior recognition model 120 will classify the behaviors observed in a video stream, and an encoder 130 will, based on the classification, produce a series of codes that represent the various changes in expression and pose of the participant over time. These timestamped encoded behaviors 140 can be stored as a representation of the video data itself. When viewing of the video is desired, the compressed data is provided to a video synthesis module 150. It can be understood that video synthesis module 150 also receives audio data and/or transcription data 160 which can be used in parallel with the outputted synthesized video in cases where one of the participants speaks or otherwise causes a sound to be present in the video stream. Furthermore, in some embodiments, the video synthesis module 150 is configured to obtain a reference frame 170 (also referred to herein as a reference image or reference clip). With the reference frame 170 and timestamped encoded behaviors 140, a simulated video 180 can be produced in which the participants shown do not remain unrealistically static, nor does it rely on the incorporation of random or inauthentic expressions. Instead, the simulated video 180 presents each participant engaging in their true-to-life behaviors, such as nodding, shaking their head, laughing, smiling, coughing, turning their face away, closing their eyes, resting their chin in their hand, etc., at the times that they actually exhibited such behavior.

Figure 2A:
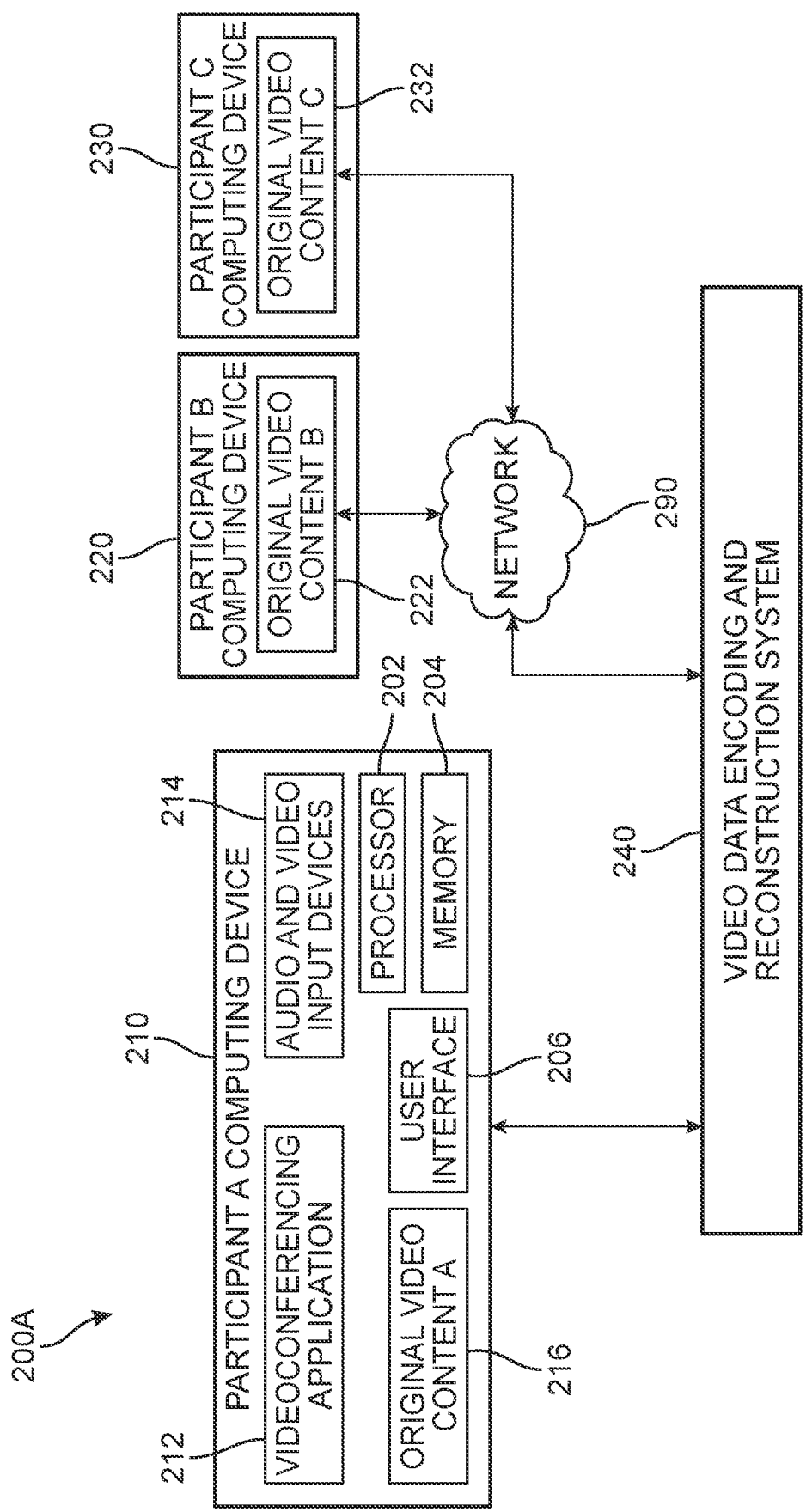
FIGS. 2A and 2B depict a schematic diagram of an environment including a system for compressing video content, according to an embodiment.
Figure 2B:
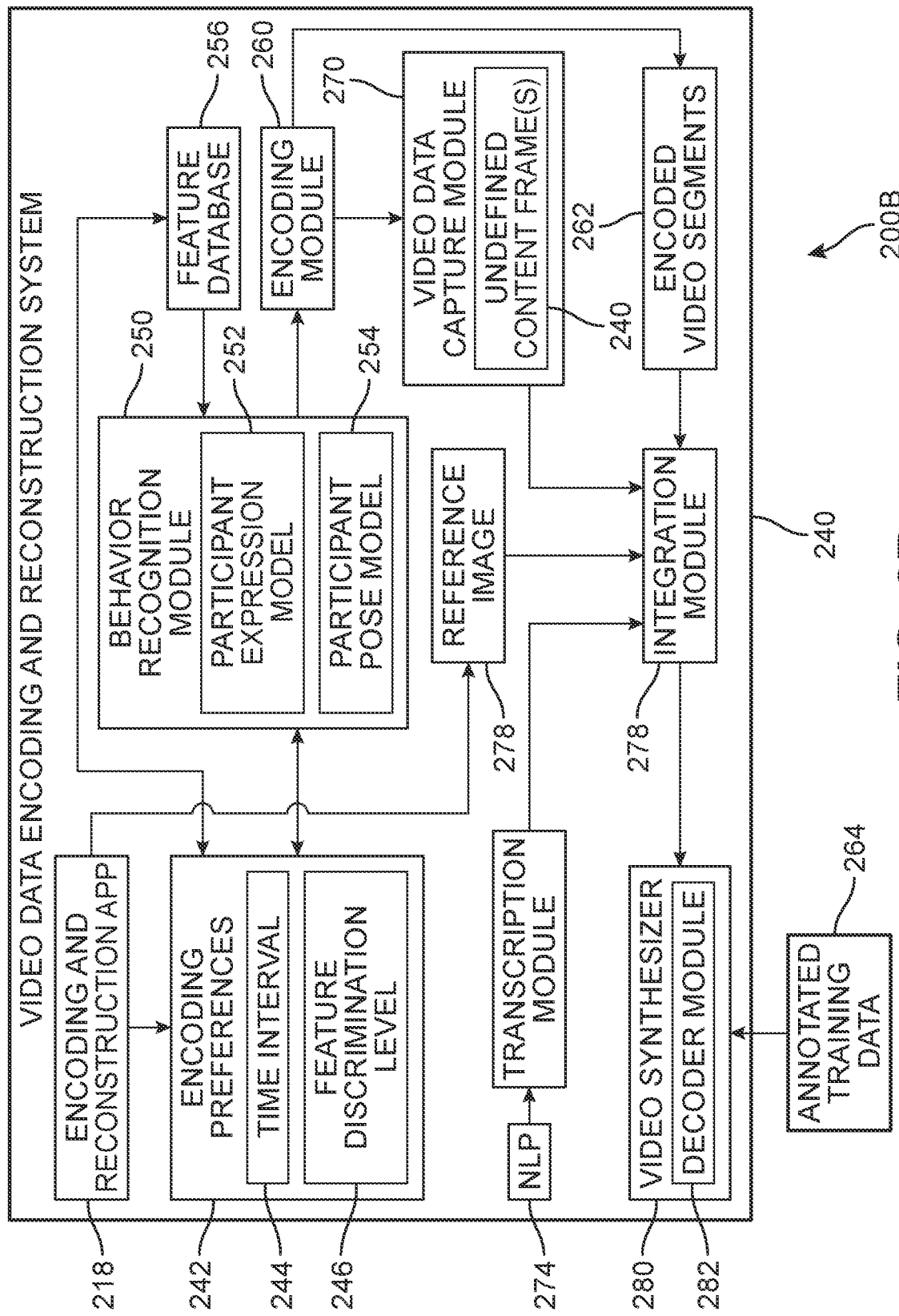

Referring now to FIGS. 2A and 2B, an environment 200a and 200b (referred to collectively herein as environment 200) for implementation of a video data encoding and reconstruction system ("system") 240 is presented. In different embodiments, one or more components/modules of the system 240 may be stored or otherwise reside locally on the user computing device, may be entirely stored in a cloud computing environment and then run on the local computing device, be mirrored across multiple user devices, or may include components residing on the local device and components residing in the cloud environment. In FIGS. 2A and 2B, the system 240 can be understood to reside in a first local computing device ("first device") for Participant A and/or in a remote server or cloud network environment. Thus, while for purposes of illustration, the system 240 is shown as separate from the first device 210, in other embodiments, no network connection for the implementation and use of the system itself may be needed as the system can reside entirely on the local computing device.

In different embodiments, first device 210 can refer to a computing system or any other computing device comprising one or more video and audio input devices 214. In one embodiment, Participant A generates or captures video data as original video content A 216, for example during interaction with a videoconferencing application 212. For example, first device 210 generates original video content A 216 using video capture or video streaming software, such as video game streaming software or video conferencing software. In one embodiment, original video content A 216 is data comprising information usable to reconstruct or regenerate one or more images or video frames, where said information is generated, in part, by one or more input devices 214 and components of system 240.

In some embodiments, input devices 214 can comprise one or more hardware components to capture image and video information. In one embodiment, an input device is or includes a software video capture program, such as a screen capture program or video conferencing program. In some cases, an input device includes a video game streaming software program. In another example, an input device includes any other software or hardware component to capture, generate, or receive video data. In another example, an input device is a camera, while in other embodiments, the input device is any other type of device further described herein to capture image and video information.

In different embodiments, first device 210 includes or is connected to at least one input device. In one embodiment, one or more input devices capture or otherwise generate two-dimensional (2D) images, video frames, or other information about one or more objects. In some embodiments, one or more of the input devices capture or otherwise generate three-dimensional (3D) images, video frames, or other information about one or more objects. In another embodiment one or more input devices capture or otherwise generate images, video frames, or other information about one or more objects usable as a reference image (e.g., a video frame) 268.

As shown in FIGS. 2A and 2B, system 240 includes a plurality of components and/or modules. When video content such as original video content A 216 is received by system 240, the sequence of frames can be analyzed by a behavior recognition module 250. In different embodiments, the submission of video can be initiated by the user of first device 210, for example via a user interface 206 for an encoding and reconstruction application ("app") 218 associated with the system 240 that is configured to process user selections and settings for implementation by the system 240.

In different embodiments, the first device 210 as well as other participating devices (e.g., second local computing device ("second device") 220 and third local computing device ("third device") 230) can refer to a variety of computing device types, such as but not limited to a desktop computer, laptop, notebook, tablet, smartphone, smartwatch, etc. Each device can include an electronics unit comprising a plurality of different components, such as a user interface component (e.g., a touchscreen display, keyboard, mouse, microphone, speaker, etc.), a user interface module, a processor 202, and/or a communication module. As used in this description, the term "module" is intended to include, but is not limited to, one or more computers, processing units, or devices configured to execute one or more software programs that include program code that causes a processing device(s) or unit(s) of the computer to execute one or more functions. The device may include a system including one or more processors 202 and memory 204. Memory 204 may comprise a non-transitory computer readable medium. Instructions stored within memory 204 may be executed by the one or more processors 202. The device may be configured to receive and analyze data from various input sensors associated with the device or data that is communicated from external components or devices connected to the device. Each device can serve as a source of video data that is incorporated into the larger video file. For example, second device 222 produces and transmits original video content B (of Participant B) 222, over network 290 to system 240, and third device 230 produces and transmits original video content C (of Participant C) over network 290 to system 240, etc.

For purposes of this disclosure, a participant of a video stream is one transfers or otherwise communicates original video data to system 240 while engaging in a videoconferencing session, while a user of the proposed system is one who requests the video data to be encoded and compressed and/or requests playback of an encoded video stream. A user may also be a participant in the video stream. In some embodiments, data from other participants (e.g., Participant B, Participant C, etc.) can be received at first device 210 over network servers 290. In other embodiments in which two or more participants have access to system 240, first device 210 may instead receive encoded video data that will be translated by a decoder module 282 of a video synthesizer 280, as will be discussed below. In other words, if Participant B has a local video data encoding and reconstruction system on their device, but Participant C does not, and Participant A wishes to view playback of the conference, the system 240 may obtain a reference image and codes from second device 220 and original video content C from third device 230 in order to recreate the videoconferencing session. Thus, in some embodiments, one "tile" of a participant in a call may be fully authentic (original video data) while another "tile" may be a simulated recreation based on the generated codes. In another example, the system 240 can process the received Original Video Content C 232 as it has processed Original Video Content A 216, and all of the tiles will be simulated. The entire video conference can then be stored as a set of reference images and codes, as well as in some cases one or more undefined content frames or clips (see below).

A communication module may allow the device to communicate wirelessly. In this case, the communication module is illustrated as enabling access to a wireless network 202; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In one embodiment, the service is configured to be available completely offline, such that all features and components described for the application reside locally on the user's computing device.

User interfaces for APIs (application programming interfaces) can be used to facilitate an end user's interaction with, for example, a distributed computing environment (e.g., a web-based application), or an application residing wholly on a single computer system (e.g., a stand-alone application). In different embodiments, one or more of the computing devices can include a device display ("display") that can, for example, present information and media for a software application ("app"). In some embodiments, the app is associated with or is a platform providing the audio modification assistant service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device. In some cases, while the client software that allows users to perform various tasks may be run on user device, some of the software data may be retrieved from and stored on databases associated with a remote server.

In some embodiments, participants can receive and send information through a user interface that may be presented on the device display. In some embodiments, the display may be a touchscreen, allowing the customer to interact with the user interface directly by touch. The user interface may refer to an operating system user interface or the interface of one or more software applications that may run on the device. In some embodiments, the user interface can include a messaging window or other chat-space by which the assistant may present messages or other digital content or the user may provide input. In addition, the app and/or a VoIP service is configured to receive user voice inputs via an audio input device such as a microphone or other input devices 214 such as a text-to-voice or gesture-to-voice device, and components to present audio outputs (authentic and/or synthesized voices) via audio output devices such as a speaker or headphones. In some embodiments, the app can offer a user settings and profile interface for accessing and modifying settings and viewing application activity. Selections made from the profile interface can include app-related user-specific information such as user settings, the user's selected trigger event preferences, as well as an optional app activity history repository that can store and present to the user various data reflecting past app-based feedback or other responses. In some embodiments, the app can be configured to connect to the cloud (for example, via a Wi-Fi or cellular connection) to add or modify information for the user account that can also or alternatively be stored in the cloud, for example in a user account database.

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "triggering", "actuation", "triggering event", or "actuation event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In different embodiments, the app 218 can receive selections from a user that can affect performance of an encoding preferences module ("preferences") 242. Preferences 242 can, for example, determine how frequently (by time or frames) the system should be attempting to assign a behavior label to the image frames, which can affect the processing and storage requirements for the compressed video data. As a non-limiting example, the behavior recognition module 250 can be configured to assess the behavior present in the original video content every half-second or less, every second, every few seconds, etc. based on a selected time interval 244, or a number of frames (e.g., every frame, every 10 frames, every 25 frames, etc.). It should be understood that while a low frequency selection over either time or frames will reduce the use the computational resources and processing time, the number of encoded video segments will also decrease, affecting accuracy of the playback. In low frequency encodings, the reference image 268 will be relied on more heavily or often, and participants will appear more static. On the other hand, a higher frequency selection will increase the accuracy of the reconstructed video with more numerous encoded segments describing dynamic behaviors that can then be rendered more faithfully. For purposes of this application, "dynamic" behaviors refer to actions or expressions by a person that are sufficiently distinct from the person's normal listening pose, which is defined primarily by the participant's reference image 268. When the participant is not engaging in dynamic behaviors, they can be described as being relatively "static" or "passive".

For purposes of this disclosure, a reference image 268 is data comprising information about a single image or frame of video captured or otherwise generated by one or more input devices 214. In one embodiment, reference image 268, such as a video frame, is a first image in a sequence of images, such as a first frame in a sequence of video frames. This image can thereafter serve as the person's digital avatar. In some cases, reference image 268 is a component of original video content usable for reconstruction or regeneration of one or more video frames by one or more neural networks for a video synthesizer 280 included in or otherwise accessible by system 240. In some embodiments, reference image 268, such as a single image frame, is generated by one or more input devices 214 prior to generation of additional original video content by the first device 210. In one embodiment, a reference image 268 is generated by one or more input devices 214 as a result of a request to generate a new reference image 268 by a video data capture module 270 in response to the determination of a non-encoding event (see below). In different embodiments, a reference image generated by one or more input devices 214 as a result of such a request to generate a new reference image is a second image, or different image from a sequence of images, such as a different frame in a sequence of video frames, and will be referred to instead as undefined content frame(s) 272. The undefined content frame(s) 272 include one or more frames (snippets, clips, GIFs, etc.) taken from the original video content at time points where either behavior recognition module 250 has failed to identify the behavior of the participant during those frames and/or where encoding classifier 260 is unable to apply a code to these frames because no code has been defined for such behavior, or the behavior is unrecognizable or otherwise unknown.

In some embodiments, a user can also select a feature discrimination level 246 that will be applied by the behavior recognition module 250. Feature discrimination level 246 refers to the number of behaviors that will be recognized and then classified as distinct, discrete behavior events. The feature discrimination level 246 can be customized using feature database 256, which is a repository of features that can be used to define a behavior or otherwise indicate that a particular behavior is occurring. For example, wrinkling of a nose in a face can be linked to sneezing behavior. If a user selects a higher level of discrimination, frames will be analyzed with reference to more (nuanced) features, while a lower level of discrimination means the same frames will be analyzed with reference to fewer features and only describe a behavior generally.

As a non-limiting example, a person may close their eyes for one minute during a video call. The eye closure can be a first-level behavior. However, a few seconds later, the user also rubs their closed eyes. The eye rubbing can be a second-level behavior. In addition, someone trying to clear sleep crust from their eyes can be a third-level behavior. Each of these behaviors can be defined and the behavior recognition module 250 trained to recognize them. However, a user may wish for only first-level behaviors to be reconstructed. Thus, the outputted synthesized video would only show the participant closing their eyes, and generally maintain this pose, rather than depict the eye rubbing and/or clearing. In another example, a person may smile slightly, present a half-smile, smile fully, smile widely, or laugh. Each of these facial expressions are points on a gradient which is associated with amusement or enjoyment. A user selecting first-level feature discrimination would see the participant produce an average smile, regardless of the actual smile range. A user selecting a third-level feature discrimination would see the participant half-smile, and then perhaps start laughing. A behavior can be defined as discretely as the recognizable features associated with it are defined, and as broadly as a user wishes under a single umbrella expression or gesture. In addition, the features themselves can be defined based on the cultural norms of the participants' region to more accurately classify certain behaviors.

In different embodiments, system 240 converts original video content to video frames or other data using one or more neural networks. In one embodiment, system 240 comprises one or more parallel processing units (PPUs), such as graphics processing units (GPUs). In another embodiment system 240 accelerates or otherwise improves inferencing performance of one or more neural networks using one or more PPUs, such as GPUs. In one embodiment, a system 240 utilizes one or more PPUs, such as GPUs, for any other purpose related to services provided to one or more clients by said system 240. As one example, a GPU for neural network training and a processor for inference can be employed.

In different embodiments, the behavior recognition module 250 can include one or more models configured to detect and label specific human behaviors such as facial expressions, changes in pose, and gestures. As a general matter, facial expressions are the facial changes in response to a person's internal emotional states, intentions or social communications. From a computer vision point of view, facial expression analysis refers to computer systems that attempt to automatically analyze and recognize facial motions and facial feature changes from images. Facial expression analysis includes both measurement of facial motion and recognition of expression. The general approach to automatic facial expression analysis (AFEA) consists of three steps: face acquisition, facial data extraction and representation, and facial expression recognition. A participant expression model 252 is configured to extract and represent the facial changes caused by facial expressions. In facial feature extraction for expression analysis, there are mainly two types of approaches: geometric feature-based methods and appearance-based methods.

Depending on the different facial feature extraction methods, the effects of in-plane head rotation and different scales of the faces can be removed by face normalization before the feature extraction or by feature representation before the step of expression recognition. Facial expression recognition is the last stage of AFEA systems. The facial changes can be identified as facial action units (AUs) or prototypic emotional expressions. In some embodiments, the expression model 252 can make use of the facial action coding system (FACS), which consists of 44 facial AUs, which are codes that describe certain facial configurations, and/or emotion recognition algorithms. Thirty AUs are anatomically related to contraction of a specific set of facial muscles. It can be appreciated that the production of a facial action has a temporal evolution, which plays an important role by interpreting emotional displays. The temporal evolution of an expression is typically modeled with four temporal segments: neutral, onset, apex and offset. Neutral is the expressionless phase with no signs of muscular activity. Onset denotes the period during which muscular contraction begins and increases in intensity. Apex is a plateau where the intensity usually reaches a stable level, whereas offset is the phase of muscular action relaxation. The expression model 252 incorporates machine learning techniques.

As noted above, the behavior recognition module 250 can also be configured to detect and classify poses, which include human gestures and changes in body position. For example, behavior recognition module 250 can include or otherwise have access to a participant pose model 254. The pose model 254 is configured to evaluate image data to determine whether a gesture or change in body position has occurred. As a general matter, gesture can be understood to refer to the use of motions of the limbs or body as a means of expression, to communicate an intention or feeling. The majority of hand gestures produced by speakers are meaningfully connected to speech. These communicative hand movements have been defined along a "gesture Kendon's Continuum" as five different kinds of gestures including (1) Gesticulation: spontaneous movements of the hands and arms that accompany speech; (2) Language-like gestures: gesticulation is integrated into a spoken utterance, replacing a particular spoken word or phrase; (3) Pantomimes: gestures that depict objects or actions, with or without accompanying speech; (4) Emblems: familiar gestures such as "V for victory", "thumbs up", and assorted rude gestures (often culturally specific); and (5) Sign languages: Linguistic systems, such as American Sign Language, which are well defined.

It can be appreciated that some gestures have both static and dynamic elements, where the pose is important in one or more of the gesture phases; this is particularly relevant in sign languages. When gestures are produced continuously, each gesture is affected by the gesture that precedes it, and possibly, by the gesture that follows it. There are several aspects of a gesture, which may be relevant and therefore may need to be represented explicitly in computer vision systems. The pose model 254 is configured to identify and classify each of these types of gestures. For example, in one embodiment, four aspects of a gesture can be determined by the pose model 254: (a) Spatial information—where it occurs, locations a gesture refers to; (b) Pathic information—the path which a gesture takes; (c) Symbolic information—the sign that a gesture makes; and (d) Affective information—the emotional quality of a gesture. The classification assigned to a sequence of image frames can include multiple subclassifications that describe some or all of these aspects. Static gesture or pose recognition can be accomplished using template matching, geometric feature classification, neural networks (NNs), or other standard pattern recognition techniques to classify pose. Dynamic gesture recognition, however, requires consideration of temporal events, and the pose model 254 in determining whether a specific type of gesture is occurring will also take into account the timing of each change in pose. This can, for example, be accomplished by using techniques such as time-compressing templates, dynamic time warping, hidden Markov models (HMMs) and/or Bayesian networks.

In some embodiments, the pose model and expression model can be components of a single machine learning model (referred to as a behavior model), and together produce a unified output. The training of the models can be based at least in part on annotated video files, where the annotation can be manually added and/or prepared via AI (artificial intelligence) assisted annotation. For example, once training video data is received, AI-assisted annotation may be used to aid in generating annotations corresponding to imaging data to be used as ground truth data for the behavior recognition module's models. In one embodiment, AI-assisted annotation may include one or more machine learning models (e.g., convolutional neural networks (CNNs)) that may be trained to generate annotations corresponding to certain types of imaging data. in some embodiments, AI-assisted annotations may then be used directly, or may be adjusted or fine-tuned using an annotation tool (e.g., by a participant, developer, or other end-user), to generate ground truth data. In another embodiment labeled video data may be used as ground truth data for training a machine learning model. In one embodiment, AI-assisted annotations, labeled video data, or a combination thereof may be used as ground truth data for training a machine learning model. In different embodiments, the training data can vary based on regional, cultural, and other behavioral differences associated with the original video content. In another embodiment one or more of behavior machine learning models may already be trained and ready for deployment at the local device.

The behavior recognition module 250 can be trained to detect common actions or expressions produced by non-speaking participants in videoconferences using previously recorded and annotated conference calls. In some embodiments, the behavior model can be further tested by being fed simulated video output from the video synthesizer 280 and determining whether the simulated video largely matches the original video content. If there are more discrepancies than desired, the behavior model will continue to be trained and refined with additional annotated training data until the simulated video output more closely aligns with the original video stream.

In some embodiments, dynamic classifications (a term used interchangeably with the term "labels" herein) assigned to the image frames after being processed by the behavior recognition module 250 will be time-stamped or otherwise include a sequence of frames that are associated with said label. Thus, for example, a label can be assigned to video data for T1, T2, T3, and/or the same label can be assigned to sequence of Frames 6-30 to ensure the correct portion of video includes the appropriate behavior classification. Feature database 256 can provide categorical descriptors and characteristics that will be available for application by the behavior recognition module 250 in accordance with the selected feature discrimination level 246, as discussed above. In some embodiments, a particular video segment will be assigned one dynamic classification (e.g., "laughing"). In another embodiment, the same video segment can be assigned multiple dynamic classifications (e.g., "laughing", "shaking head") and/or subclassifications ("grinning", "dimples", "mouth open wide", "shaking head fast/slow", etc.). These dynamic classifications can in some cases differ in response to instructions provided via the encoding preferences 242. In an exemplary embodiment, a video segment may comprise a plurality of image frames, and the frames collectively will be classified under a single label or set of labels. Thus, a "sneeze" classification may refer to a video segment of 24 frames, while a "yawn" classification may refer to a video segment of 48 frames. In another example, the labels can be based on time intervals, such that a "sneeze" classification may refer to a video segment of one second, while the "yawn" classification is for a video segment extending across 4-10 seconds. In some embodiments, a dynamic classification attached to a segment of video automatically isolates that portion of video so that no other classifications can overlap with the segment.

In different embodiments, the timestamped classifications outputted from the behavior recognition module 250 are received by encoding module 260. The encoding module 260 is configured to exchange each classified video segment for one or more preset codes. The code(s) that is used to 'replace' the video segment depends on the label that was assigned to the video segment describing the participant's expression and/or pose. As some non-limiting examples, a first video segment of approximately four seconds is assigned a "nodding" label, a second video segment of approximately nine seconds is assigned a "sipping-from-cup" and "eyes-closed" label, a third video segment of approximately twenty seconds is assigned a "grinning" label, "shaking-head" label, and "raising-arms-in-the-air" label, and a fourth video segment of approximately two seconds is assigned a "thumbs-up"; in some cases, an additional sub-label "right-hand" can be added.

Figure 3:
FIG. 3 is an example chart showing possible code values that can be assigned to different behavioral classifications, according to an embodiment.

For purposes of illustration, a simplified code chart 300 is presented in FIG. 3. The chart 300 is shown only to help the reader better visualize the compression process, and does not in any way limit the encoding mechanisms that may be used herein. Thus, once the model has identified a behavior in a video segment, the encoding module can transform said video segment to a code. With respect to the first video segment, a first code corresponding to "nodding" such as "3005" can be used to entirely replace the first video segment. In some cases, the code can include duration, such that "3005:4" or "3005.4" etc. can be used to indicate the head is to nod for four seconds at the appropriate time. In another example, the code can include intensity, such as how fast or slow the person is performing the behavior (i.e., nodding) on a scale of 1-9. For example, a video segment of a person nodding very quickly for four seconds may be encoded as "3005.4.9", which will enable the video synthesizer to not only reconstruct the nodding action, but the quick speed with which the nodding was occurring.

Similarly, a second code such as "2002:9" indicates the behavior occurs over a nine second long duration and can be used to entirely replace the second video segment, a third code such as "8943:20" with a twenty second long duration can be used to entirely replace the third video segment, and a fourth code such as "5500:2" can be used to entirely replace the fourth video segment. In some embodiments, each code can refer to a single type of behavior and so a single segment might be encoded with several codes for multiple overlapping behaviors (e.g., a code for winking and a code for smiling with the same timestamp, that together will cause the video synthesizer to present the person winking and smiling at the same time). This is illustrated with the third video segment, where three different behaviors (identified by assignation of a "grinning" label, "shaking-head" label, and "raising-arms-in-the-air" label) have been combined and encoded as 8943. Thus, the encoding module can generate a single code can encompass and 'stand for' multiple behaviors that are occurring simultaneously to represent a holistic or unified behavior.

It should be understood that video synthesizer 280 is able to transform each code in a manner that is seamless using transitional sequences. For example, the two second thumbs-up gesture will include, in those two seconds, the movement of the person's hand in preparation of producing the thumbs-up gesture, the actual thumbs-up gesture, and the return to the default hand pose. In cases where the thumbs-up code is for a longer duration, the period in which the actual thumbs-up gesture occurs will be extended. It should be understood that while numeric codes are described herein for purposes of simplicity, any other coding paradigm may be used, including alphanumeric, symbolic, and other coding techniques.

Returning to FIGS. 2A and 2B, as a general matter, it can be appreciated that for most of the streaming video, the participant will be only nominally moving, and the detection of the various dynamic behaviors by a listener will be infrequent. In different embodiments, the encoding module is configured to encode all non-dynamic intervals for a participant under a default or baseline code, such as "0001". The code is automatically applied to the next video segment if there is no dynamic classification assigned to a portion of video, and will cause a reversion to a relatively static (but living) view of the participant in the streaming video based primarily on the person's reference image 268 that will continue until the next portion of video that has been assigned a dynamic classification.

There may be some cases where a given video segment includes a movement or other behavior that cannot be identified by the behavior recognition module 250. For example, a person may produce a sequence of expressions and/or gestures, or interact with an unknown object, that cannot be labeled with any strong probability by the system. In some embodiments, a segment with an indeterminate or otherwise unidentifiable behavior can cause a specific type of label to be assigned such as "unknown" that indicates that there is too much ambiguity for the system to make a determination, and/or that the behavior is undefined based on the currently available classifications. The encoding module's response to such a classification can vary based in part on the encoding preferences 242. For example, a user may select an option whereby such video segments are reconstructed as static moments based on reference image 268; for example, the "unknown" label may cause a code of "9999" to replace the video segment, and "9999" causes the video synthesizer 280 to revert to the static persona of the participant. However, it may be appreciated that salient information may be lost during this process. To address this, in some embodiments, the system 240 can include a specialized video capture module 270 that is configured to receive video segments that have been classified as indeterminate. In response, the video capture module 270 will store the corresponding video images as undefined content frame(s) 272, which will typically comprise a segment of video that can be referred to as a snippet, clip, or GIF. As will be discussed below, these snippets of original video content can be interspersed in the synthetic video that will be generated by the video synthesizer 280 at the appropriate times. This approach increases storage requirements only when the behavior is not otherwise identifiable, and increases the fidelity of the playback.

In different embodiments, the system 240 can include or have access to a natural language processor (NLP) 274. For example, embodiments of the proposed systems and methods may make use of various techniques and technologies, such as but not limited to speech processing, speech synthesis, and Natural Language Processing (NLP) systems. As a general matter, speech processing is a technology that allows computing devices to recognize—and, to some extent, understand—spoken language. Typically, one or both of two types of software products may be implemented: continuous-speech recognition software products and command-and-control software products. In addition, speech synthesis is a process that provides the ability to mimic speech. Because it is increasingly important that the synthesized output sounds are pleasant and sound human enough to encourage regular use, the associated software products offer highly effective and accurate conversational generation and mimicry. Similarly, NLP systems are systems that are configured to interpret written, rather than spoken, language and may be found in speech processing systems that begin by converting spoken input into text. Using lexicons and grammar rules, NLP parses sentences, determines underlying meanings, and retrieves or constructs responses.

Thus, in some embodiments, audio data for the original video content is processed by the NLP 274 in order to automatically generate transcription of the audio using, for example, via a speech-to-text processor or other ASR (automatic speech recognition) techniques and extract various other information pertaining to pre-selected parameters. In some other embodiments, a featurizer may initially deidentify data and process and convert the data to consumable features. As a general matter, NLP techniques may be used to process sample speech data as well as to interpret the language, for example by parsing sentences, and determining underlying meanings of the words. Embodiments can make use of any techniques already known in the field of natural language processing (NLP). These include any techniques in speech recognition and natural language understanding.

As one non-limiting example, the system can include the computing resources to conduct natural language processing (NLP) on received speech audio files. For example, the NLP applied by the system may include machine translation of the received speech audio files to obtain a translation of the speech captured by the received speech audio files into written text. The machine translated text may then be analyzed according to one or more NLP analyses such as text summarization and/or sentiment analysis. The NLP analyses may comprise implementing sentence breaking rules on the machine translated text to break up the text into smaller chunks of text such as paragraphs and individual sentences. The NLP analyses may further comprise tagging parts of speech identifiers (e.g., noun, verb, article, adjective) to the words that comprise a chunk of text. The NLP analyses may further comprise parsing the text to create one or more parsing tree that outline different possible interpretations for a chunk of text. The NLP analyses may further comprise terminology extraction that extracts one or more key terms from a chunk of text to better understand the context of the text. The NLP analyses may further comprise language translation capabilities to translate text from one language to another. In different embodiments, aspects such as prosody, accent, language type, dialect, speed, pronunciation, etc. may be assessed and classified.

In some embodiments, voice recordings can include recordings in various data formats including, but not limited to, MP3, WAV, AIFF, FLAC, OGG, and ACC files. Generally, audio is recorded using an audio codec. The processed signal is conveyed to NLP 274 which is configured to use acoustic models and language models to statistically analyze the sound recording and identify likely words.

For example, the speech recognition component of NLP 274 may take the digital or analog audio signal from the call and performs speech recognition analysis to recognize one or more words spoken. Speech recognition (also referred to as automatic speech recognition (ASR), computer speech recognition or voice recognition) technology generally represents a set of technologies that allows computers equipped with a source of sound input, such as a microphone, to transform human speech into a sequence of words recorded in a computer data file. Some examples of these include the use of Hidden Markov Models (HMMs), dynamic algorithms, neural network-based models, and knowledge-based approaches. Certain systems can recognize natural human speech which has the property of words "sticking together" (or coarticulated together), also referred to as continuous speech (continuous speech recognition). Other speech recognition systems and technologies may be applicable as well. In some embodiments, the speech recognition component can make use of statistical language models (SLMs) and statistical semantic models (SSMs) that determine what a speaker means in addition to the words they said. In some embodiments, the speech recognition component generates transcription and speech characteristics via transcription module 276 of the voice sample. The transcription is then provided to integration module 278, along with the reference image(s) 268, the undefined content frame(s) 272 (if any), and the encoded video segments 262. All data provided to the integration module 278 is timestamped to ensure the data can be reconstructed coherently, in the correct order, and aligned precisely with other original or reconstructed video data obtained for the same period (e.g., reconstructions or recordings of original video content B 222 and original video content C 232).

In different embodiments, once the data from various sources for a particular video segment or stream ("video session") have been collected and validated for consistency, two outputs will be generated by integration module 278. A first output will include a transcript of the video session. A second output will include a 'marked-up' transcript of the same video session. The transcript will include data such as speech-to-text of the video, as well as timestamps and, in some cases, speaker recognition and identification. The marked-up transcript will include the same data, as well as the associated codes generated by encoding module 260 for that video session (encoded video segments 262). In some embodiments, In one embodiment, the video synthesizer 280 is configured with a decoder module 282. The decoder module 282 is configured to receive codes and translate said codes to information about points of interest, or features, in a reference image ("keypoints"). Points of interest, in an embodiment, comprise locations or other data points in each video frame captured by one or more input devices 214, where each location or other data point corresponds to a feature or features, identified by one or more neural networks 106, of an object or objects in each video frame. In another embodiment points of interest comprise information about features such as eye, nose, jaw, mouth, or other facial features. In one embodiment, points of interest comprise information about hands, arms, or other object features that indicate object position. In another embodiment points of interest comprise information about any other object feature usable to facilitate reconstruction of video frames. Thus, a single specific code (e.g., "759401") can be translated or decoded as data about features associated with the encoded video frame. In one example, the decoded data describes one or more points or locations, or coordinate information associated with an individual point of interest that is will cause a modification of the reference image to produce the simulated video. Data about one or more points or locations in a video frame, in an embodiment, comprises movement information about said points or locations in said video frame. In one embodiment, data about one or more points or locations in a video frame comprises any other information capable of being identified by one or more neural networks to facilitate generation of simulated video content or to reconstruct or otherwise estimate video frames captured by one or more input devices.

In different embodiments, one or more neural networks utilized by the video synthesizer 280 are convolutional neural networks. In one embodiment, the one or more neural networks are, individually, any type of neural network usable for feature identification based on keypoints in one or more video frames as further described herein. Neural network can be any type of neural network usable to perform neural network operations further described herein. In another embodiment neural networks are trained using a training framework such as a generative adversarial network (GAN). In some embodiments, a deep neural network is trained using a training dataset and training framework such as a PyTorch framework, TensorFlow, Boost, Caffe, Microsoft Cognitive Toolkit/CNTK, MXNet, Chainer, Keras, Deeplearning4j, or other training framework. In one embodiment, weights may be chosen randomly or by pre-training using a deep belief network. In another embodiment training may be performed in either a supervised, partially supervised, or unsupervised manner.

In one embodiment, an untrained neural network is trained using supervised learning, where a training dataset includes an input paired with a desired output for an input, or where training dataset includes input having a known output and an output of neural network is manually graded. In another embodiment untrained neural network is trained in a supervised manner and processes inputs from training dataset and compares resulting outputs against a set of expected or desired outputs. In one embodiment, errors are then propagated back through untrained neural network. In another embodiment training framework adjusts weights that control untrained neural network. In one embodiment, training framework includes tools to monitor how well the untrained neural network is converging towards a model, such as a trained neural network, suitable to generating correct answers, based on input data such as a new dataset. In another embodiment training framework trains an untrained neural network repeatedly while adjusting weights to refine an output of untrained neural network using a loss function and adjustment algorithm, such as stochastic gradient descent. In one embodiment, the training framework trains untrained neural network until the untrained neural network achieves a desired accuracy. In another embodiment the trained neural network can then be deployed to implement any number of machine learning operations.

In other embodiments, the untrained neural network is trained using unsupervised learning, where the untrained neural network attempts to train itself using unlabeled data. In one embodiment, an unsupervised learning training dataset will include input data without any associated output data or "ground truth" data. In another embodiment an untrained neural network can learn groupings within the training dataset and can determine how individual inputs are related to the untrained dataset. In one embodiment, unsupervised training can be used to generate a self-organizing map in the trained neural network capable of performing operations useful in reducing dimensionality of a new dataset. In another embodiment unsupervised training can also be used to perform anomaly detection, which allows identification of data points in the new dataset that deviate from normal patterns of the new dataset.

In another embodiment, semi-supervised learning may be used, which is a technique in which in the training dataset includes a mix of labeled and unlabeled data. In one embodiment, the training framework may be used to perform incremental learning, such as through transferred learning techniques. In another embodiment incremental learning enables a trained neural network to adapt to a new dataset without forgetting knowledge instilled within the trained neural network during initial training.

As discussed above, the simulated video generated by video synthesizer 280, will primarily rely on reference image 268. In one embodiment, the reference image(s) 268 as well as undefined content frame(s) 272 are used to facilitate reconstruction of one or more video frames. In some embodiments, the video synthesizer reconstructs, using a neural network, video content from portions of original video content and the codes. In another embodiment the playback device (which can be the same as first device 210, or another computing device) comprises one or more video output devices. In one embodiment, a video output device is one or more graphics processors or graphics rendering devices capable of rendering video for display on one or more video displays. In another embodiment one or more video output devices or components receive video frames or other video data to be output for display on one or more video displays from one or more neural networks of video synthesizer 280.

For example, video synthesizer 280 will produce data values and software instructions that, when executed, reconstruct or otherwise infer one or more video frames to be displayed by one or more video output devices based on a reference image 268 and one or more codes. In one embodiment, one or more neural networks for video synthesizer 280 infer one or more video frames using the reference image(s) 268 as a base image in conjunction with information decoded from one or more codes to indicate updates to said reference image 268, for example as described in the Liu application. In another embodiment if one or more neural networks infer or otherwise determine that one or more features, such as keypoints, received as codes, indicate a new reference image 268 is required, a request may be sent to obtain a second reference image. Similarly, if one or more neural networks, in an embodiment, infer or otherwise determine that a reference image 268 has corrupted data, poor or reduced data quality, or is otherwise unusable for inference or reconstruction of one or more video frames by the video synthesizer 280, said one or more neural networks can request a new reference image 268 from the original video content. In some embodiments, a request for a new reference image 268 is one or more packets, messages, or other network communication techniques to signal or indicate that said new reference image 268 is requested by the video synthesizer 280.

In different embodiments, the video synthesizer 280 will infer, generate, or otherwise reconstruct 2D video frames from 2D original video content. One or more neural networks can infer, generate, or otherwise reconstruct 3D video frames from 3D original video content. In one embodiment, one or more receiver neural networks rotate one or more 3D characteristics of a participant, such as a face, based on the decoded codes. in some embodiments, the video synthesizer 280 can apply one or more structural adjustments or modifications to one or more video frames generated, inferred, or otherwise reconstructed. In another embodiment temporal upsampling is usable to generate additional images or video frames by the neural networks by interpolating between different received sets of features or landmarks. In one embodiment, one or more the neural networks apply style mixing to sharpen motion blurred portions of one or more images or video frames generated or otherwise inferred by said one or more neural networks of the video synthesizer 280.

In some embodiments, the video synthesizer 280 can also be configured to change a background of the reference image or modify or change one or more background objects. This can be the result of a simulated background or the undefined video content intermixed in the outputted stream. In some embodiments, one of the last frames of the undefined video content can be used to serve as a replacement reference image that will be used following the presentation of the undefined video content to ensure continuity between the segments.

Referring now to FIGS. 4-8, an example scenario in which a videoconference stream 400 comprising a speaker 440 and three participants (first participant 410, second participant 420, and third participant 430) is depicted. In different embodiments, as the videoconference is occurring (i.e., in near-real-time) a participant or speaker may request that the meeting be recorded. In general, video recordings are recorded and stored at a remote server associated with the videoconferencing app, or at the requester's local computing device, though other storage options such as external hard drives and third-party cloud storage services are possible. In another example, a video recording of a plurality of participants can be obtained from an online source such as YouTube®, Vimeo®, or other digital media provider. The participant's faces can be in the video as tiles (see FIG. 1A) or rows or columns, or be otherwise arranged. In some cases, only some participants may be visible during one part of the call, and other participants are visible during another part of the call. However, for purposes of this example, at least some participants' faces are being displayed and included in the video.

With respect to real-time scenarios, in different embodiments, during the call, if any of the participants have access to the data compression system described herein, they may opt to encode and compress their locally captured (original) video data in real-time. For example, first participant 410 may engage her compression system at her own computing device during the call. As the call occurs, the encoded data from her device (that describes her behaviors) will be shared with the other persons on the call. Those who have their video synthesis feature engaged, for example second participant 420, will see a simulated version of the original video content captured at the first participant's device representing the first participant 410, and original (authentic) video content for the speaker 440 and the third participant 430 if they are not using the data compression system. Even with only one of the 'tiles' being simulated, the bandwidth required to deliver the image data to the second participant 420 has substantially decreased. It can be appreciated that as more participants opt to use the data compression system, the size of the video stream will drop further. If all participants use the data compression system, the bandwidth needed will be negligible compared to that required for a standard video presentation.

In the case of a pre-recorded video that is stored remotely relative to the viewer with access to components of a data compression system, the viewer's local system can request that the stored video be fully encoded and the compressed data be downloaded or streamed, rather than the large video file. The viewer's local decoder and video synthesizer will receive the small file comprising codes, audio and/or transcript, and reference image(s) and reconstruct a video simulating the video that was encoded, as an implementation of edge computing techniques. Storing the compressed file on the viewer's device would be in a range of a few tens of megabytes, in contrast to videos which typically require hundreds to thousands of megabytes. The simulated output need not be stored, but the codes could be used to reconstruct the video again whenever desired. Thus, in some embodiments, the system's encoding model would run as the video is being recorded (real-time); alternatively, the encoding model could be run offline on a pre-recorded video that is stored, for example in the cloud or at another remote location. The system would employ image classification techniques as described herein to automatically identify codes.

Figure 4:
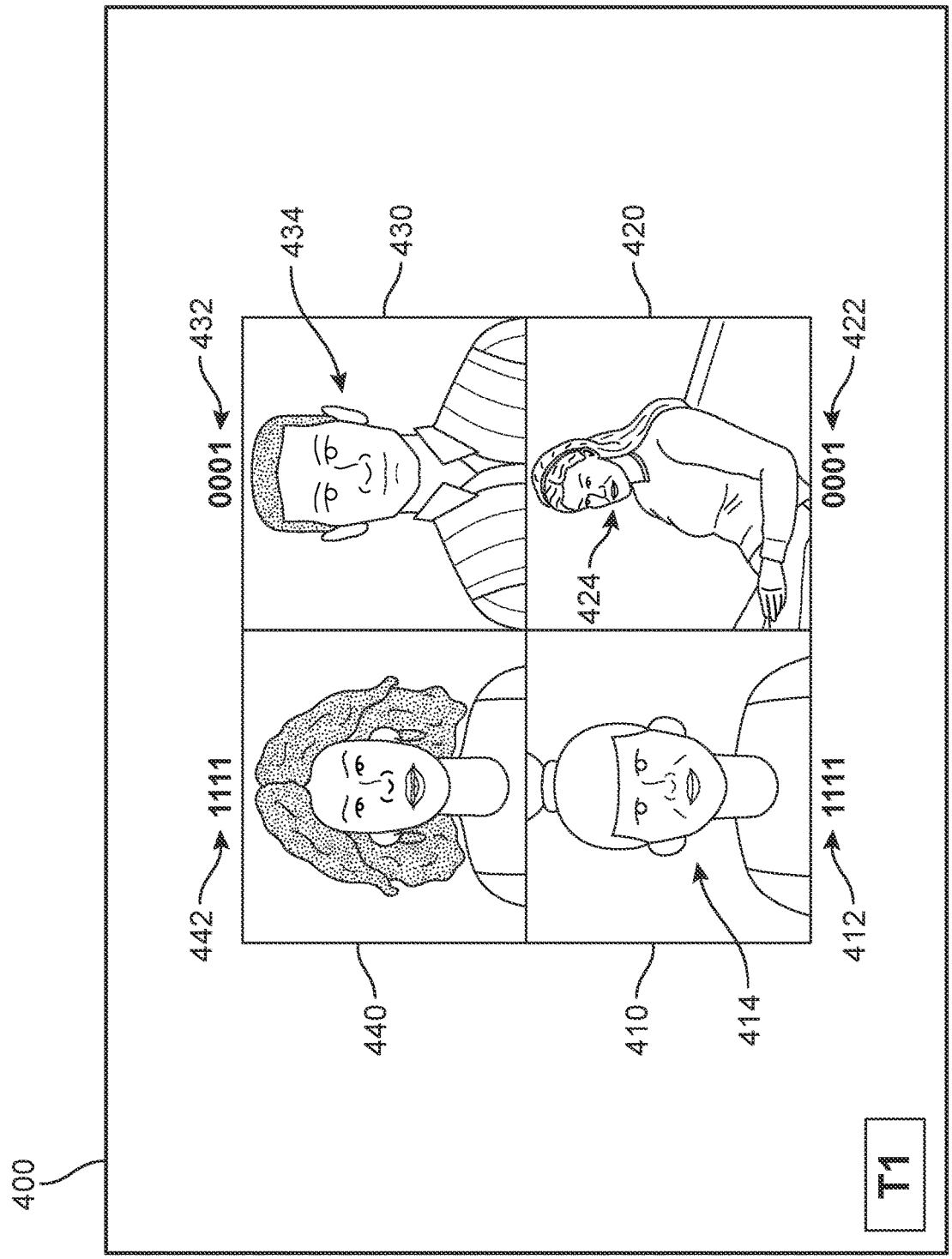
FIGS. 4-7 present a sequence of drawings in which a communication session occurs involving multiple participants and the behaviors of each person are encoded, according to an embodiment.

In FIGS. 4-7, original video content 402 is created and then processed by the data compression system, for example at a local device or a remote server. In FIG. 4, at a first time T1, the three participants are gazing forward towards their own cameras, "watching" the speaker 440. A reference image for each of the participants is captured or otherwise obtained. For example, a first reference image 414 for first participant 410, a second reference image 424 for second participant 420, and a third reference image 434 for third participant 434 are obtained by the data compression system at or around first time T1. A reference image may also be obtained for the speaker 440. The system labels and codes each reference image as "0001" (for example) to reflect its status as a baseline. Thus, at first time T1, a first code 412 of 0001 (baseline) has been assigned to a video segment of first participant 410, a second code 422 of 0001 (baseline) has been assigned to a video segment of second participant 420, a third code 432 of 0001 (baseline) has been assigned to a video segment of third participant 430, and a fourth code 442 of 1111 (corresponding for purposes of this example to the baseline for a speaker role) has been assigned to a video segment of speaker 440. These encodings can also be tracked in a code table 820 in FIG. 8.

Figure 5:
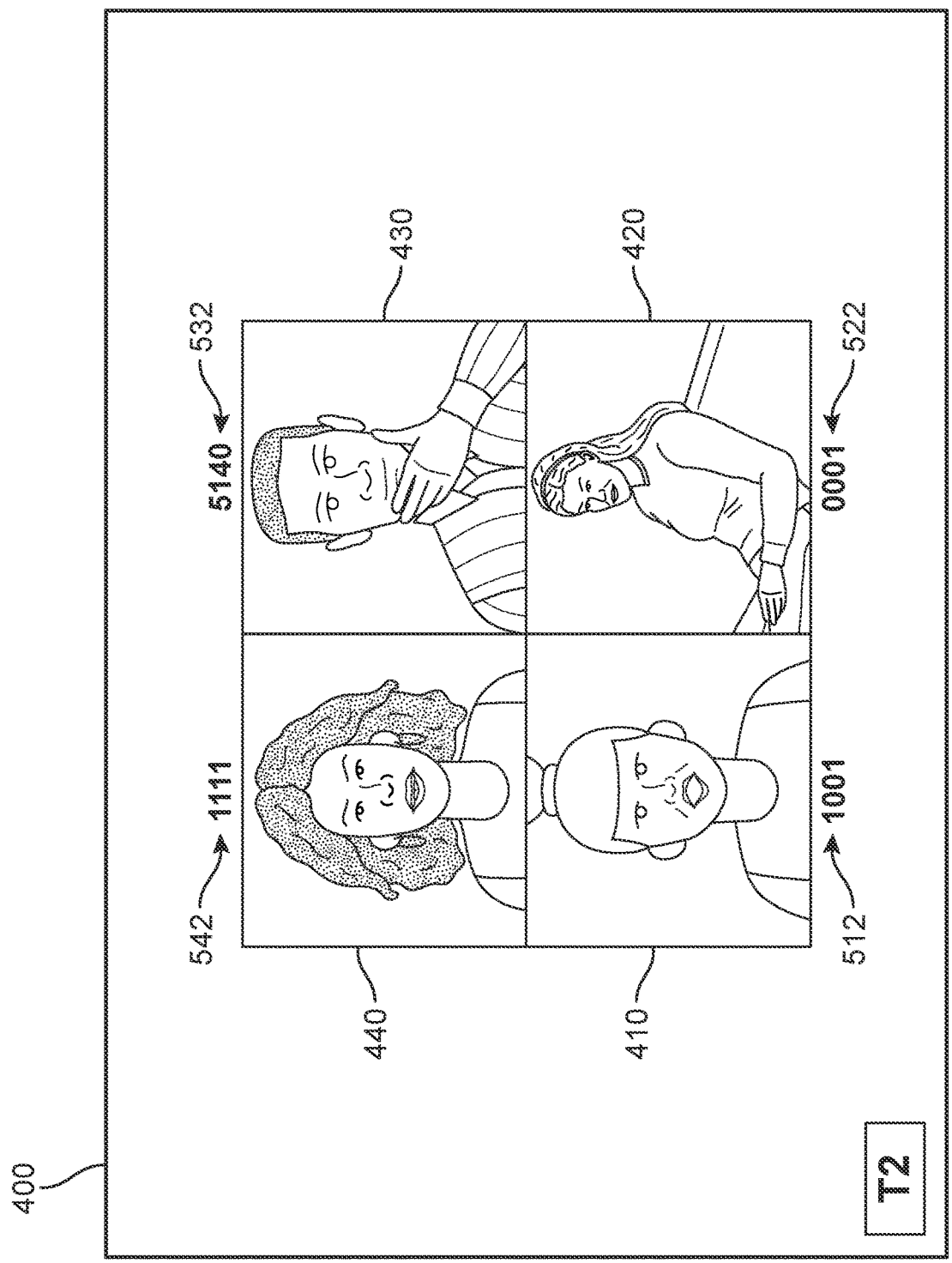

In FIG. 5, at a second time T2 that occurs after first time T1, it can be seen that some of the participants have changed pose and/or expression. The system, via behavior recognition module, recognizes that first participant 410 is in the middle of a yawning behavior. In response, the encoding module codes the portion of the video of first participant 410 occurring at or around second time T2 under a fifth code 512 of "1001" that corresponds to yawning (see FIG. 3). Similarly, the system recognizes that third participant 430 has moved his hand to cup his chin. In response, the encoding module codes the portion of the video of third participant 430 occurring at or around second time T2 under a sixth code 532 of "5140" that corresponds to a hand cupping a chin (see FIG. 3). In contrast, second participant 420 has remained relatively still, and so her initial code continues unchanged even at second time T2. Speaker 440 is continuing to speak, and her code remains 1111.

Figure 6:
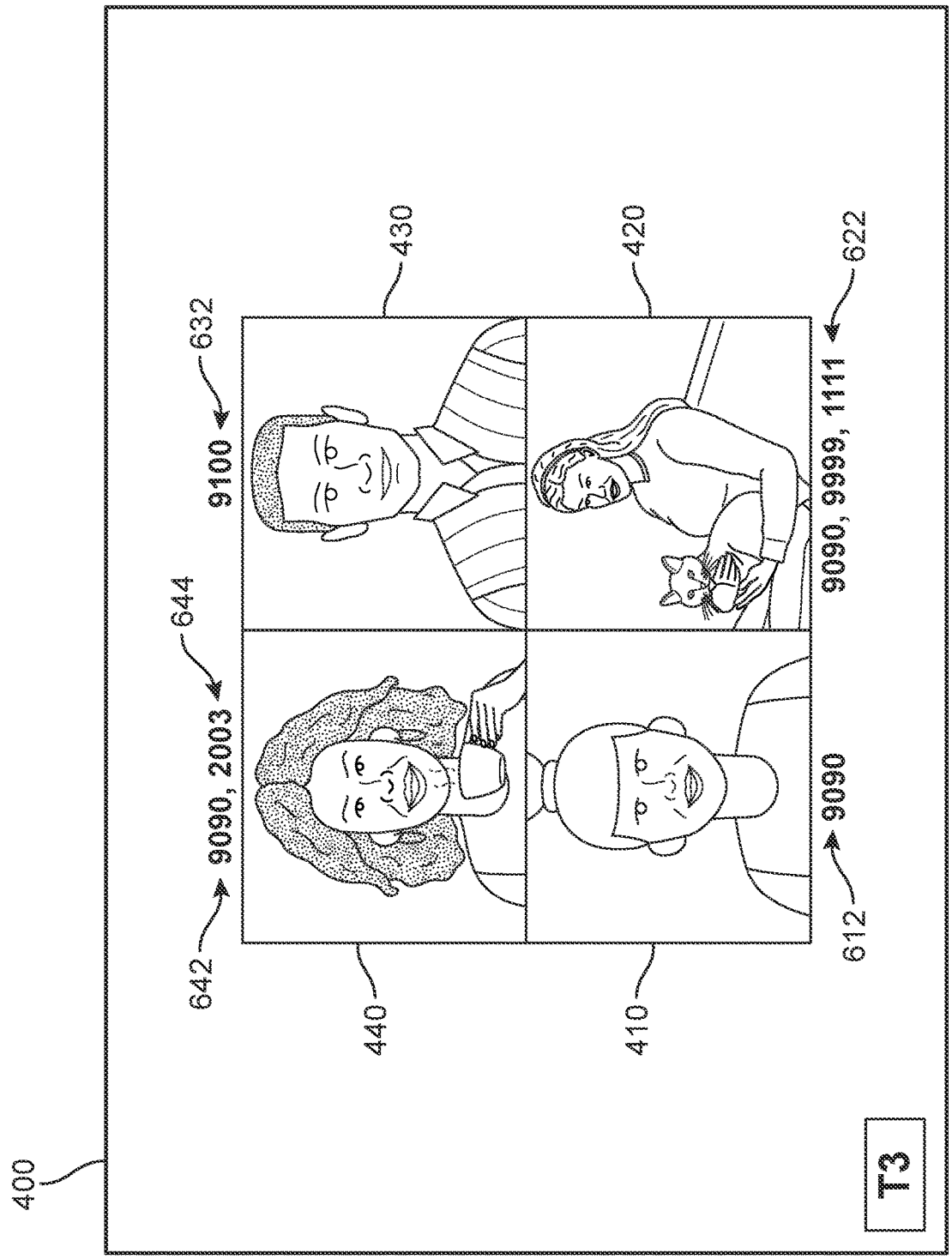

In FIG. 6, at a third time T3 that occurs after second time T2, it can be seen that all of the participants have changed pose and/or expression. The system, via behavior recognition module, recognizes that first participant 410 is in the middle of a smiling behavior. In response, the encoding module codes the portion of the video of first participant 410 occurring at or around third time T3 under a seventh code 612 of "9090" that corresponds to smiling (see FIG. 3). In addition, the system recognizes that the second participant 420 has changed pose significantly to a pose that is not recognized (9999) while wearing a smiling expression (9090) and talking (1111) about the cat that has suddenly appeared. Others in the conference are expressing their amusement at this visitor. In some embodiments, although three separate codes can be associated with the second participant 420 at this time, the unrecognized code overrides any other behavior identification, and so the encoding module codes the portion of the video of second participant 420 occurring at or around third time T3 under an eighth code 622 of "9999" to indicate the behavior could not be classified. In this case, the cat is seated on the lap of the second participant 420 while she wraps her arms around the cat. Furthermore, the system recognizes that third participant 430 is presenting a grinning behavior. In response, the encoding module codes the portion of the video of third participant 430 occurring at or around third time T3 under a ninth code 632 of "5140" that corresponds to a hand cupping a chin (see FIG. 3). Similarly, speaker 440 is no longer speaking, and instead is engaged in smiling and sipping a cup. The codes can be accepted by the system as occurring simultaneously, so the encoding module codes the portion of the video of speaker 340 occurring at or around third time T3 under a tenth code 642 of "9090" that corresponds to smiling as well as an eleventh code 644 of "2003" that corresponds to holding a cup.

Figure 7:
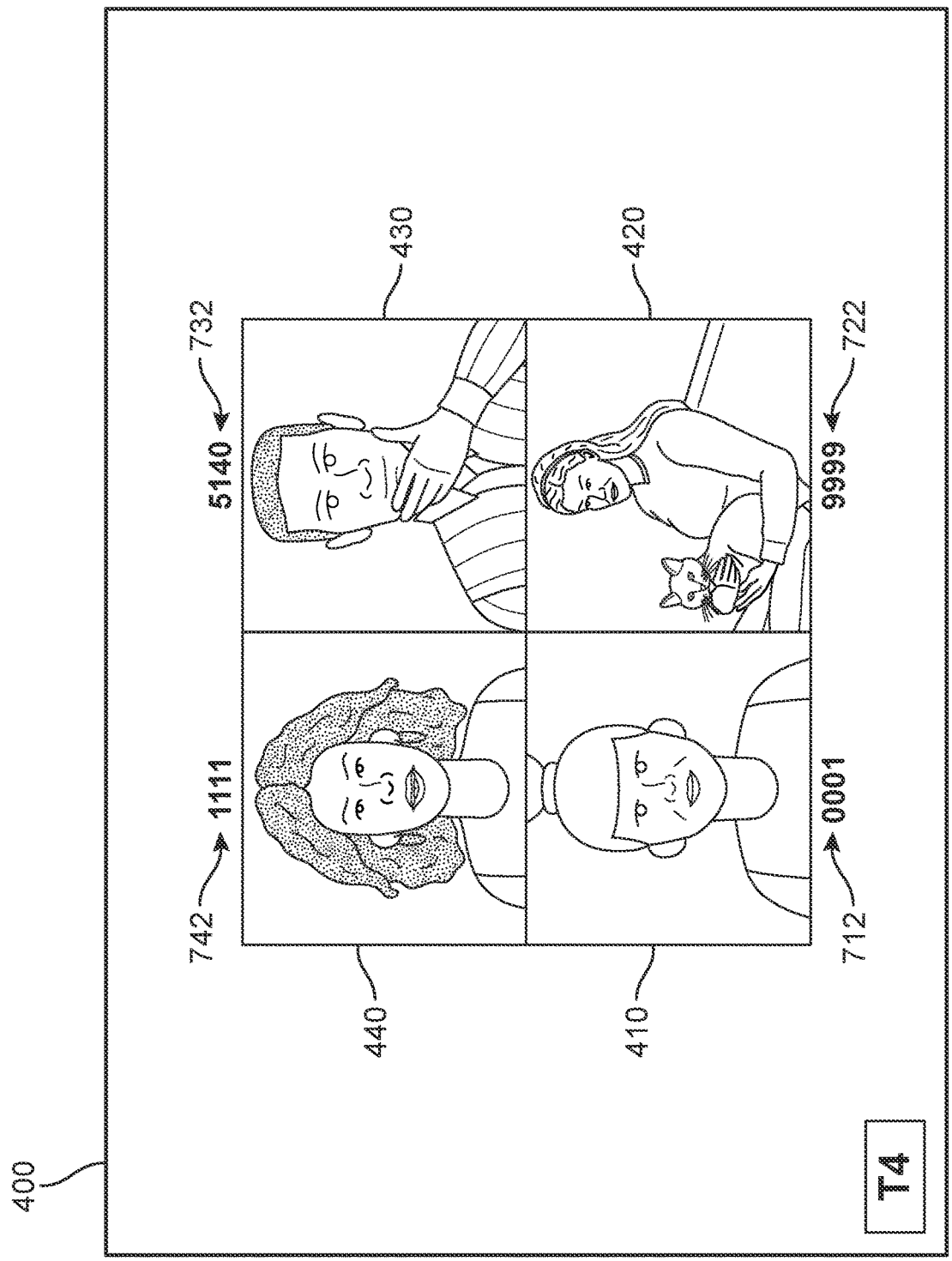

Referring next to FIG. 7, at a fourth time T4 that occurs after third time T3, it can be seen that all of the participants have again changed pose and/or expression. The system, via behavior recognition module, recognizes that first participant 410 is back at her baseline behavior ("inactive state" in which the reference image can be presented with little modification). In response, the encoding module codes the portion of the video of first participant 410 occurring at or around fourth time T4 under a twelfth code 712 of "0001" that corresponds to the baseline (see FIG. 3). In addition, the system recognizes that the second participant 420 is continuing to present an unrecognizable behavior, and so the encoding module applies a maintained code 722 of "9999" for the portion of the video of second participant 420 occurring at or around fourth time T4 to indicate the behavior continues to be unclassifiable. (In this case, the cat is remains in the video.) Furthermore, the system recognizes that third participant 430 is again cupping his chin. In response, the encoding module codes the portion of the video of third participant 430 occurring at or around fourth time T4 under a fourteenth code 732 of "5140" that corresponds to a hand cupping a chin. Finally, the speaker 440 has also begun to speak again, and the encoding module codes the portion of the video of the speaker 440 occurring at or around fourth time T4 under a fifteenth code 742 ("1111").

In different embodiments, the system is configured to store the coded video for later use. For example, in FIG. 8A, two tables representing separate file items for the same video are shown. A transcript table 810 shows each participant (P1, P2, P3) and the speaker (S) and an indication of whether audio speech data was produced for them at each of the times T1, T2, T3, and T4. A code table 820 can be understood to serve as a 'marked-up' or supplemental set of data that represents the continuum of video that was processed as a sequence of codes. A separate supplemental table 830 is also presented for purposes of clarity to the reader. As noted earlier, in cases where the behavior could not be classified, the system can be configured to obtain the unclassified video segment for insertion during the simulated playback. In this example, video for second participant P2 occurring at or around third time T3 and fourth time T4 was coded as 9999, or not recognized. In response, the video data capture module (see FIGS. 2A and 2B) will save the sequence of frames corresponding to those times. When playback of the video for times T3 and T4 occurs, the video for second participant P2 will shift from a simulation to the original video content until the next known (recognized) behavior classification occurs, at which time the video will be synthesized again.

Figure 8A:
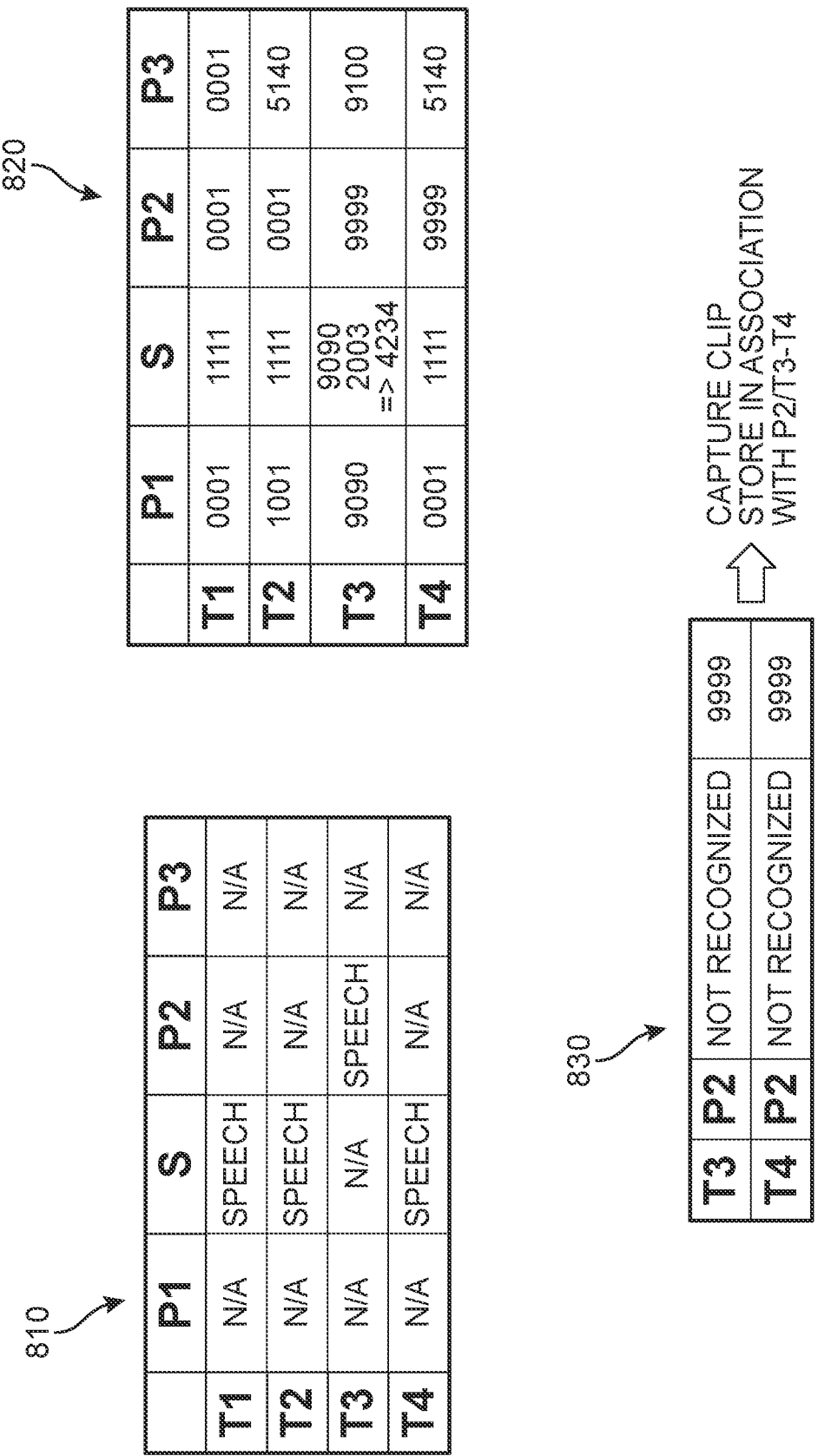
FIG. 8A shows a set of tables that represent the behaviors of the participants during the communication session, according to an embodiment.
Figure 8B:
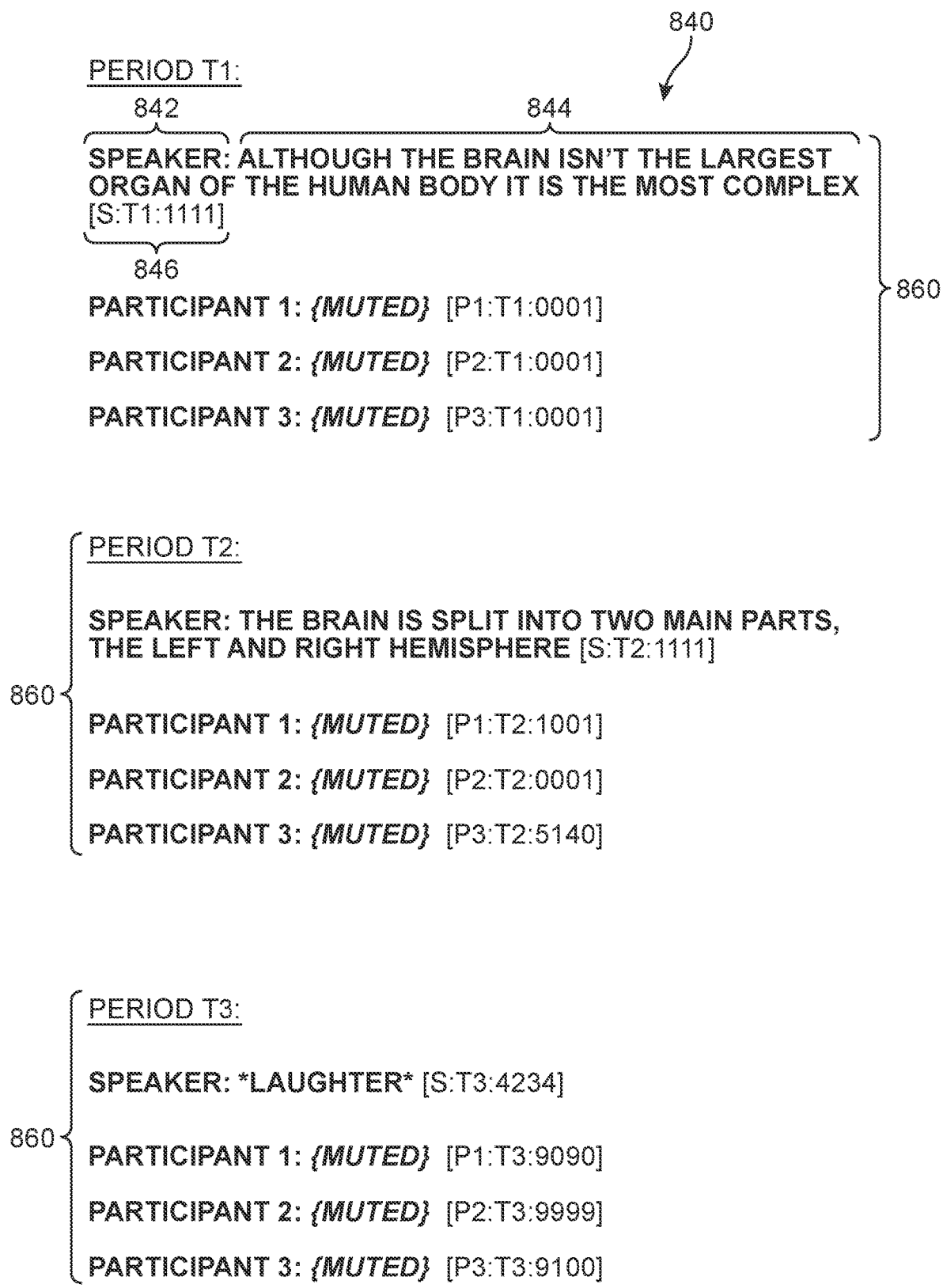
FIG. 8B shows a marked-up file including a transcript of a video conference and machine readable code representing the behaviors of the participants during the conference, according to an embodiment.

As another example, FIG. 8B shows a marked-up file that can be employed by the system as a form of the encoded (compressed data). In different embodiments, the file may be a document that includes a transcript of a video conference and machine readable code representing the behaviors of the participants during the conference. In some embodiments, the code itself is 'hidden' and only the transcript is shown to human readers, while the corresponding code is stored as a secondary layer that is accessible to the system. In other embodiments, the code can be revealed to a human viewer by selecting a code-viewing mode when accessing the document.

In FIG. 8B, which is depicted only for purposes of example with the understanding that the encoded file can be generated or rendered in a variety of other formats, a transcript 840 for a sequence of three time periods (Period T1 860, Period T2 870, and Period T3 880) and accompanying 'mark-up' language for storing participant behaviors is presented. More specifically, during the Period T1, the audio produced by Speaker 842 is transcribed as a first utterance 944. Following the first utterance 944, a first code "{S:T1:1111}" 846 is provided, with elements corresponding to the speaker's identity (S), the time (T1), and the behavior (1111). In other embodiments, alternative or additional elements can be included in first code 846, such as but not limited to codes for (a) multiple behaviors occurring during T1, such as a quick sequence of behaviors or overlapping behaviors, depending on the discrimination level selected, (b) designating relative positions of video tiles in the larger video stream, (c) a confidence value for the classification of the behavior, etc. The speaker's simulated video would, of course, be based on a conversation artificial intelligence video synthesizer configured to match the movements of the mouth with the words that have been spoken.

In general, traditional or conventional transcripts typically do not identify listeners, and instead only show the participant's presence when they verbally contribute. In this case, in order to represent the coding applied to all of the group members, the participant's portion is also depicted. For example, second participant 852 is identified as having been present during the call. Their status 854 is "(Muted)", reflecting their lack of audio. In addition, a second code "{P2:T1:0001}" 856 is provided, with elements corresponding to the participant's identity (P1), the time (T1), and the behavior (0001). While, for purposes of simplicity, the speaker remains "the speaker" and the participants remain "the listeners" through this example, it should be understood that there may be multiple instances in which each listener becomes a speaker, and the speaker becomes a listener. During these types of exchanges, the system will cause the output of the synthesized video to accommodate the audio output for the new speaker, while also accurately rendering the behavior of the speaker-turned-listener.

Figure 9:
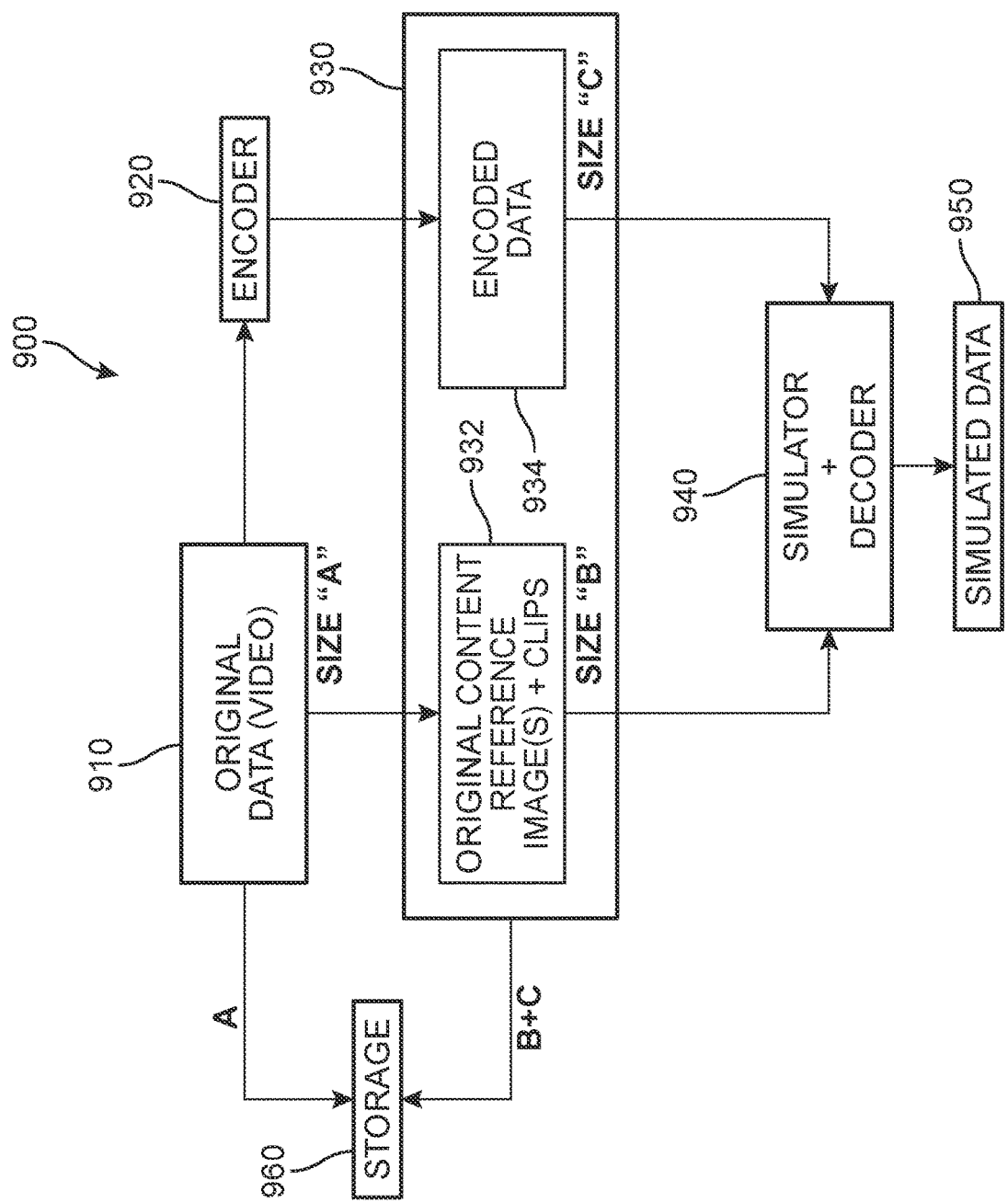
FIG. 9 is a schematic flow diagram depicting a process of storing data for an original video and its compressed version, according to an embodiment.

For purposes of clarity, an overview of the process described herein with respect to coding and reconstruction is presented in a flow diagram 900 of FIG. 9. In this high-level schematic, original data 910 can be stored in storage 960. Original data has a first file size "A". When the original data 910 is processed by embodiments of the data compression system, an encoder 920 can replace some, most, or nearly all of the video with a sequence of codes (encoded data 934). Encoded data has a second file size "B". In addition, preserved original content 932 in the form of reference image(s) and clips for unclassified content will be preserved. Preserved original content 932 has a third file size C. Collectively, compressed video data 930 will have a file size of "B+C". As a general matter, the file size "A" as compared to the file size "B+C" is significantly larger, and will typically be hundreds to thousands time greater in size. Nevertheless, when the compressed video data 930 is provided to the video synthesizer ("simulator") and its associated decoder 940, the outputted simulated data 950 carries the bulk of the information that had been captured as original data 910.

Figure 10:
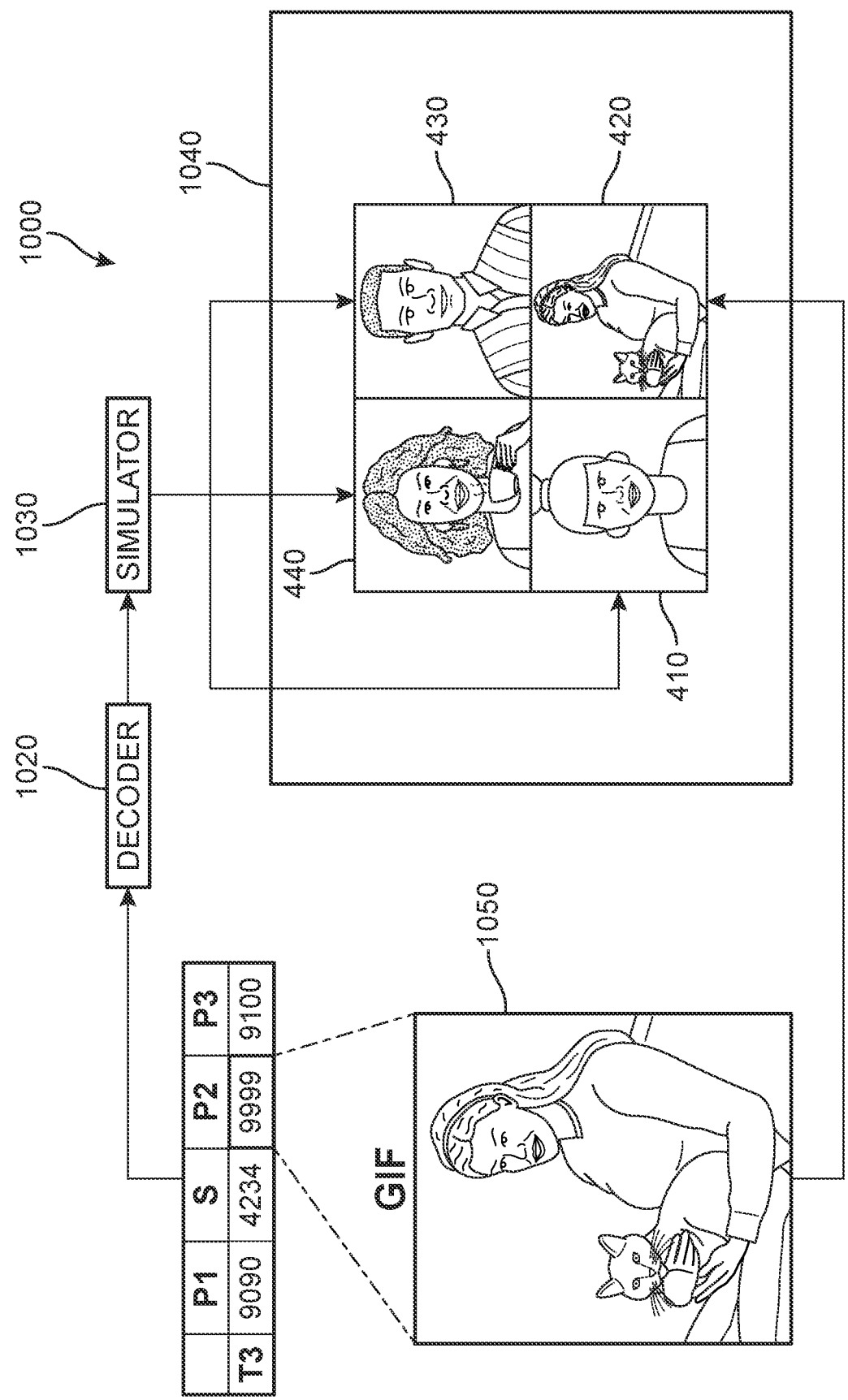
FIG. 10 is a schematic flow diagram showing one example of a process for generating a simulation via a video synthesizer, according to an embodiment.

An embodiment of the reconstructed output is illustrated in a schematic diagram 1000 in FIG. 10. Referring back to third time T3 shown in FIG. 6, the participants had each changed pose or expression, and second participant 420 had engaged in an unrecognized behavior. This is represented by table excerpt 1010 in FIG. 10. A decoder 1020 encoded each of the recognized behaviors, and when playback is requested, the encoded sequence is sent to simulator 1030, which generates a reconstruction of the image frames associated with third time T3 for first participant 410, speaker 440, and third participant 430. However, with respect to the second participant 420, a GIF 1050 was clipped and stored, and is now inserted into the video data to provide an accurate representation of the second participant 420.

Figure 11:
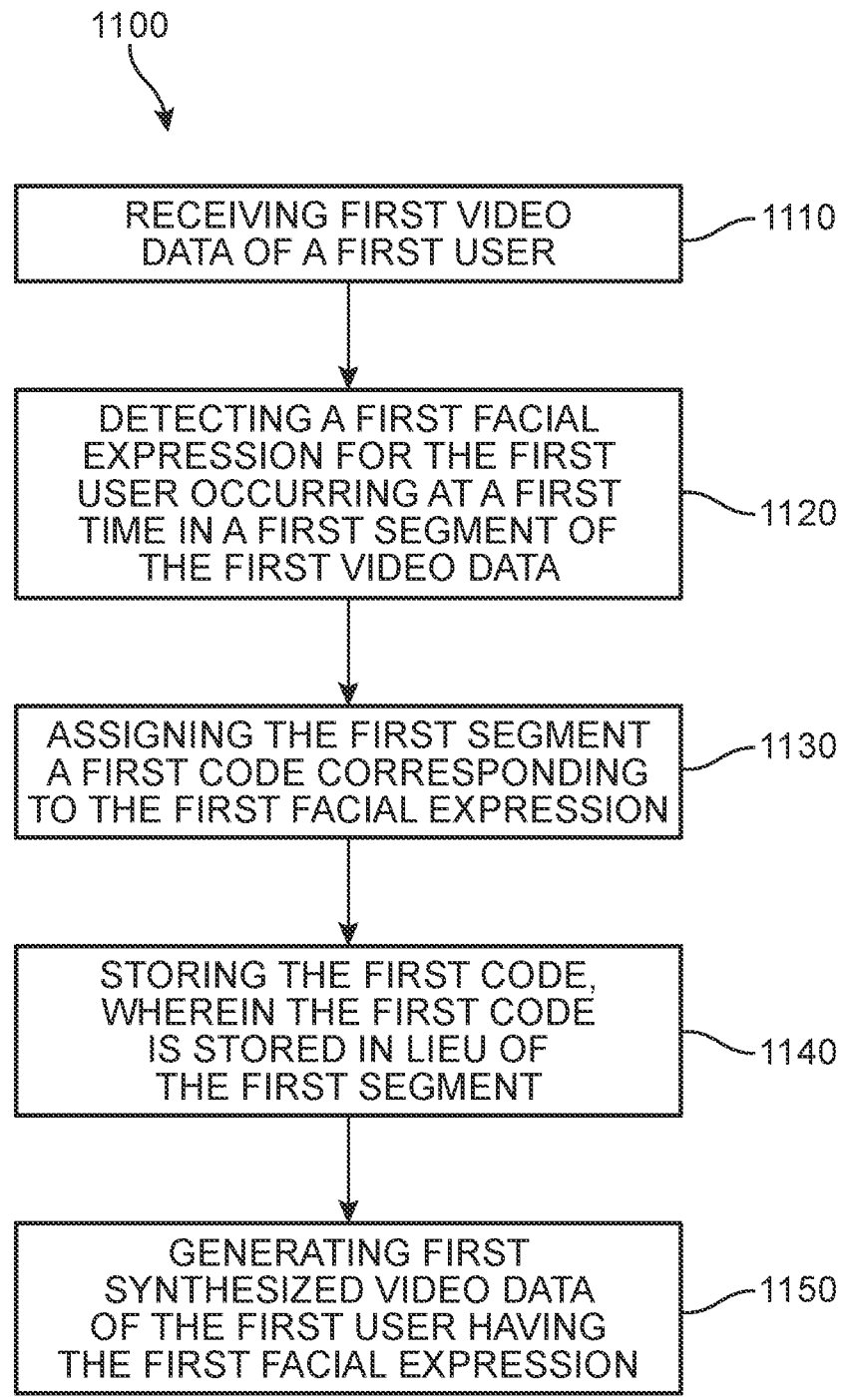
FIG. 11 is a flow diagram of a process of computer-implemented method for compressing video content, according to an embodiment.

FIG. 11 is a flow chart illustrating an embodiment of a computer-implemented method 1100 of compressing video data. The method 1100 includes a first step 1110 of receiving, by a data compression system accessed via a computing device, first video data of a first user and a second step 1120 of detecting, via a behavior recognition module of the data compression system, a first facial expression for the first user occurring at a first time in a first segment of the first video data. For purposes of this application, a segment refers to a chronological sequence of frames in a video, typically greater than five frames. A third step 1130 includes assigning, via an encoder of the data compression system, the first segment a first code corresponding to the first facial expression, and a fourth step 1140 includes storing, in an encoded behavior file for the first video data, the first code, wherein the first code is stored in lieu of the first segment. The method 1100 also includes a fifth step 1150 of generating, via a video synthesizer and based on the first code, first synthesized video data of the first user having the first facial expression.

In different embodiments, the method 1100 can include additional steps or aspects. For example, the method 1100 can also include a step of identifying and storing, at the data compression system and in an initial segment of the video data, a reference image of the first user, whereby the first synthesized video data is generated based only on the reference image and the first code. In some embodiments, the method also includes steps of detecting, via the behavior recognition module, a second facial expression for the first user occurring at a second time in a second segment of the first video data that is directly subsequent to the first segment, assigning, via the encoder, the second segment a second code corresponding to the second facial expression, storing, in the encoded behavior file, the second code, wherein the second code is stored in lieu of the second segment, and generating, via the video synthesizer and based on the second code, second synthesized video data of the first user having the second facial expression. In one example, the method can further include receiving, at the computing device, a request for playback of the first video data, and presenting, at the computing device and in response to the request, the first synthesized video data followed by the second synthesized video data as a continuous video stream.

In some embodiments, the method 1100 also includes steps of determining, via the behavior recognition module, that a behavior of the first user occurring at a second time in a second segment of the first video data directly subsequent to the first segment is unclassifiable, and identifying and storing, via the data compression system, a first video clip that includes the second segment in response to determining the second segment is unclassifiable. In another example, the method also includes steps of assigning, via the encoder, the second segment a second code in response to determining the second segment is unclassifiable, and storing, in the encoded behavior file, the second code. In one embodiment, the method further includes receiving, at the computing device, a request for playback of the first video data, and presenting, at the computing device and in response to the request, the first synthesized video data followed by the first video clip as a continuous video stream.

In some examples, the method also includes steps of detecting, via the behavior recognition module, a second facial expression for the first user occurring at a third time in a third segment of the first video data that is directly subsequent to the second segment, assigning, via the encoder, the third segment a third code corresponding to the second facial expression, storing, in the encoded behavior file, the third code, wherein the third code is stored in lieu of the third segment, generating, via the video synthesizer and based on the third code, second synthesized video data of the first user having the second facial expression, and presenting, at the computing device, following the first video clip, the second synthesized video data as part of the continuous video stream. In one example, the method further includes steps of detecting, via the behavior recognition module, a first gesture made by the first user occurring at a second time in a second segment of the first video data that is directly subsequent to the first segment, assigning, via the encoder, the second segment a second code corresponding to the first gesture, storing, in the encoded behavior file, the second code, wherein the second code is stored in lieu of the second segment, and generating, via the video synthesizer and based on the second code, second synthesized video data of the first user making the first gesture.

Other methods can also be contemplated within the scope of this disclosure. For example, a computer-implemented method of compressing video data is disclosed. The method includes a first step of receiving, by a data compression system accessed via a computing device, a video file including a first video of a first user and a second video of a second user engaged in a conference call, and a second step of detecting, via a behavior recognition module of the data compression system, a first facial expression for the first user occurring over a first duration in a first segment of the first video and a second facial expression for the second user occurring over the first duration in a second segment of the second video. A third step includes assigning, via an encoder of the data compression system, the first segment a first code corresponding to the first facial expression, and the second segment a second code corresponding to the second facial expression. A fourth step includes storing, in an encoded behavior file associated with the first video file the first code, wherein the first code is stored in lieu of the first segment and the second code, wherein the second code is stored in lieu of the second segment. A fifth step includes generating, via a video synthesizer and based on the first code and the second code, first synthesized video data representing the first duration of the conference call that includes a simultaneous reconstruction of the first segment and the second segment.

In other embodiments, the method may include additional steps or aspects. In one embodiment, the method also includes storing, at the data compression system, a first reference image of the first user taken from the first video and a second reference image of the second user taken from the second video, and the first synthesized video data is generated based only on the first reference image with the first code and the second reference image with the second code.

Other methods can also be contemplated within the scope of this disclosure. For example, the proposed systems and methods can include steps of receiving a plurality of videos, each video from a separate user and computing device, collectively streaming together as a single video stream or content. Each of these videos can be encoded by the proposed systems. When playback is desired, the videos are reconstructed by the video synthesizer and integrated to produce a single, continuous video stream that simulates the original video stream. In some embodiments, the simulated video is only representative of the participants who are primarily non-speakers in the video, and the video of the main speaker(s) are transmitted and presented via separate means. However, in other embodiments, the system can include generation of a transcription for the video stream and the incorporation of the transcription with the coded behaviors for the speaker(s) to produce a simulation of the speaker(s). The video synthesizer is configured to base its simulation on a set of reference images that serve as templates for the output. Typically, the reference images are captured from an initial segment of the video.

In some embodiments, the proposed methods also include steps of only storing a code for a first segment and maintaining the presentation of the corresponding behavior during playback of the video for a time period including additional consecutive segments until a new behavior is detected or the person returns to their default pose. In such cases, a single code can be used to stand for multiple segments, and then a second code can be used for the segment(s) in which new or different behavior has been detected. In some embodiments, the default pose or expression is associated with a code, and in some other embodiments, the segments of video in which the default behavior is occurring with not be encoded to indicate the use of the reference image without further modification. In another example, the system can receive a selection of a preference option in which the user chooses the level of feature discrimination that should be applied by the system and/or the frequency by which the system will classify a behavior in the video. In one case, the system will then apply a more detailed or discrete level of classification with further sub-classifications, or can apply a more broad or high-level of classifications in which only a few behaviors are classified and the detection of the default (resting) state of a person is more likely to occur. In another example, based on a high frequency selection, the system will parse the video into segments based on the frequency (time interval) selected. In some embodiments, the video data is obtained via a video-conferencing application such as Zoom®, Microsoft Teams®, Slack®, or other communication apps, etc.

Media generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® Geforce Now (GFN), Google® Stadia, and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method of compressing video data, the method comprising:
   receiving, by a data compression system accessed via a computing device, first video data of a first user;
   detecting, via a behavior recognition module of the data compression system, a first facial expression and a first facial expression classification for the first user occurring at a first time in a first segment of the first video data;
   assigning, via an encoder of the data compression system, the first segment a first code corresponding to both the first facial expression classification and a duration of the first segment;
   storing, in an encoded behavior file for the first video data, the first code, wherein the first code is stored in lieu of the first segment thereby entirely replacing the first segment with the first code; and
   generating, via a video synthesizer and based on the first code, first synthesized video data of the first user having the first facial expression.

2. The method of claim 1, further comprising storing, at the data compression system and in an initial segment of the video data, a reference image of the first user, and the first synthesized video data is generated based only on the reference image and the first code.

3. The method of claim 1, further comprising:
   detecting, via the behavior recognition module, a second facial expression and a second facial expression classification for the first user occurring at a second time in a second segment of the first video data that is directly subsequent to the first segment;
   assigning, via the encoder, the second segment a second code corresponding to the second facial expression classification;
   storing, in the encoded behavior file, the second code, wherein the second code is stored in lieu of the second segment; and
   generating, via the video synthesizer and based on the second code, second synthesized video data of the first user having the second facial expression.

4. The method of claim 3, further comprising:
   receiving, at the computing device, a request for playback of the first video data; and
   presenting, at the computing device and in response to the request, the first synthesized video data followed by the second synthesized video data as a continuous video stream.

5. The method of claim 1, further comprising:
   determining, via the behavior recognition module, that a behavior of the first user occurring at a second time in a second segment of the first video data directly subsequent to the first segment is unclassifiable; and
   storing, via the data compression system, a first video clip that includes the second segment in response to determining the second segment is unclassifiable.

6. The method of claim 5, further comprising:
   assigning, via the encoder, the second segment a second code in response to determining the second segment is unclassifiable; and
   storing, in the encoded behavior file, the second code.

7. The method of claim 6, further comprising:
   receiving, at the computing device, a request for playback of the first video data; and
   presenting, at the computing device and in response to the request, the first synthesized video data followed by the first video clip as a continuous video stream.

8. The method of claim 7, further comprising:
   detecting, via the behavior recognition module, a second facial expression and a second facial expression classification for the first user occurring at a third time in a third segment of the first video data that is directly subsequent to the second segment;
   assigning, via the encoder, the third segment a third code corresponding to the second facial expression classification;
   storing, in the encoded behavior file, the third code, wherein the third code is stored in lieu of the third segment;
   generating, via the video synthesizer and based on the third code, second synthesized video data of the first user having the second facial expression; and
   presenting, at the computing device, following the first video clip, the second synthesized video data as part of the continuous video stream.

9. The method of claim 1, further comprising:
   detecting, via the behavior recognition module, a first gesture and a first gesture classification made by the first user occurring at a second time in a second segment of the first video data that is directly subsequent to the first segment;
   assigning, via the encoder, the second segment a second code corresponding to the first gesture classification;
   storing, in the encoded behavior file, the second code, wherein the second code is stored in lieu of the second segment; and
   generating, via the video synthesizer and based on the second code, second synthesized video data of the first user making the first gesture.

10. A computer-implemented method of compressing video data and generating synthetic video data, the method comprising:
    receiving, by a data compression system accessed via a computing device, a video file including a first video of a first user and a second video of a second user engaged in a conference call;
    normalizing a face of the first user in the first video and normalizing a face of the second user in the second video;
    detecting, via a behavior recognition module of the data compression system, a first expression of the normalized face and a first facial expression classification for the first user occurring over a first duration in a first segment of the first video and a second expression of the normalized face and a second expression classification for the second user occurring over the first duration in a second segment of the second video, wherein the first expression classification and the second expression classification are based on a facial action coding system;
    assigning, via an encoder of the data compression system:
       the first segment a first code corresponding to both the first facial expression classification and the first duration;
       the second segment a second code corresponding to a second facial expression classification;
    storing, in an encoded behavior file associated with the video file:
       the first code, wherein the first code is stored in lieu of the first segment thereby entirely replacing the first segment with the first code; and
       the second code, wherein the second code is stored in lieu of the second segment; and
    generating, via a video synthesizer and based on the first code and the second code, first synthesized video data representing the first duration of the conference call that includes a simultaneous reconstruction of the first segment and the second segment.

11. The method of claim 10, further comprising storing, at the data compression system, a first reference image of the first user taken from the first video and a second reference image of the second user taken from the second video, and the first synthesized video data is generated based only on the first reference image with the first code and the second reference image with the second code.

12. A system for compression of video data, the system comprising a processor and machine-readable media including instructions which, when executed by the processor, cause the processor to:
 receive, by a data compression system accessed via a computing device, first video data of a first user;
 detect, via a behavior recognition module of the data compression system, a first facial expression based on a specified feature discrimination level and a first facial expression classification for the first user occurring at a first time in a first segment of the first video data, wherein the specified feature discrimination level describes a number of behaviors that will be recognized and then classified as distinct, discrete behavior events;
 assign, via an encoder of the data compression system, the first segment a first code corresponding to the first facial expression classification;
 store, in an encoded behavior file for the first video data, the first code, wherein the first code is stored in lieu of the first segment thereby entirely replacing the first segment with the first code; and
 generate, via a video synthesizer and based on the first code, first synthesized video data of the first user having the first facial expression, wherein the first synthesized video data includes a segment of video data corresponding to the duration of the first facial expression.

13. The system of claim 12, wherein the instructions further cause the processor to store, at the data compression system and in an initial segment of the video data, a reference image of the first user, and the first synthesized video data is generated based only on the reference image and the first code.

14. The system of claim 12, wherein the instructions further cause the processor to:
 detect, via the behavior recognition module, a second facial expression based on the specified feature discrimination level and a second facial classification for the first user occurring at a second time in a second segment of the first video data that is directly subsequent to the first segment;
 assign, via the encoder, the second segment a second code corresponding to a second facial expression classification;
 store, in the encoded behavior file, the second code, wherein the second code is stored in lieu of the second segment; and
 generate, via the video synthesizer and based on the second code, second synthesized video data of the first user having the second facial expression.

15. The system of claim 14, wherein the instructions further cause the processor to:
 receive, at the computing device, a request for playback of the first video data; and
 present, at the computing device and in response to the request, the first synthesized video data followed by the second synthesized video data as a continuous video stream.

16. The system of claim 12, wherein the instructions further cause the processor to:
 determine, via the behavior recognition module, that a behavior of the first user occurring at a second time in a second segment of the first video data directly subsequent to the first segment is unclassifiable based on the specified feature discrimination level; and
 store, via the data compression system, a first video clip that includes the second segment in response to determining the second segment is unclassifiable.

17. The system of claim 16, wherein the instructions further cause the processor to:
 assign, via the encoder, the second segment a second code in response to determining the second segment is unclassifiable; and
 store, in the encoded behavior file, the second code.

18. The system of claim 17, wherein the instructions further cause the processor to:
 receive, at the computing device, a request for playback of the first video data; and
 present, at the computing device and in response to the request, the first synthesized video data followed by the first video clip as a continuous video stream.

19. The system of claim 18, wherein the instructions further cause the processor to:
 detect, via the behavior recognition module, a second facial expression based on the specified feature discrimination level and second facial expression classification for the first user occurring at a third time in a third segment of the first video data that is directly subsequent to the second segment;
 assign, via the encoder, the third segment a third code corresponding to the second facial expression classification;
 store, in the encoded behavior file, the third code, wherein the third code is stored in lieu of the third segment;
 generate, via the video synthesizer and based on the third code, second synthesized video data of the first user having the second facial expression; and
 present, at the computing device, following the first video clip, the second synthesized video data as part of the continuous video stream.

20. The system of claim 12, wherein the instructions further cause the processor to:
 detect, via the behavior recognition module, a first gesture based on the specified feature discrimination level and a first gesture classification made by the first user occurring at a second time in a second segment of the first video data that is directly subsequent to the first segment;
 assign, via the encoder, the second segment a second code corresponding to the first gesture classification;
 store, in the encoded behavior file, the second code, wherein the second code is stored in lieu of the second segment; and
 generate, via the video synthesizer and based on the second code, second synthesized video data of the first user making the first gesture.

* * * * *